(12) United States Patent
Kaji et al.

(10) Patent No.: US 7,389,735 B2
(45) Date of Patent: Jun. 24, 2008

(54) DOCKING SUPPORTING APPARATUS, AND MARINE VESSEL INCLUDING THE APPARATUS

(75) Inventors: Hirotaka Kaji, Shizuoka (JP); Takao Kawai, Shizuoka (JP)

(73) Assignees: Yamaha Hatsudoki Kubushiki Kaisha, Shizuoka (JP); Yamaha Marine Kabushiki Kaisha

( * ) Notice: Subject to any disclaimer, the term of this patent is extended or adjusted under 35 U.S.C. 154(b) by 21 days.

(21) Appl. No.: 11/531,427

(22) Filed: Sep. 13, 2006

(65) Prior Publication Data
US 2007/0073454 A1    Mar. 29, 2007

(30) Foreign Application Priority Data
Sep. 15, 2005    (JP) .............................. 2005-268587

(51) Int. Cl.
 *G05D 1/00* (2006.01)
(52) U.S. Cl. .............................. 114/144 RE; 114/230.1; 340/23; 701/21
(58) Field of Classification Search ............. 114/144 B, 114/144 RE, 230.1, 382; 342/23; 701/21
See application file for complete search history.

(56) References Cited

U.S. PATENT DOCUMENTS 3,772,693 A * 11/1973 Allard et al. .................. 342/23
4,063,240 A * 12/1977 Isbister et al. ................. 342/21
4,216,538 A * 8/1980 Tomlinson et al. ............. 367/89
5,432,515 A * 7/1995 O'Conner .................... 342/23
6,677,889 B2 * 1/2004 Van Rees et al. .............. 342/41
6,994,046 B2   2/2006 Kaji et al.
2003/0137445 A1 * 7/2003 Van Rees et al. .............. 342/41
2003/0160717 A1 * 8/2003 Mattes et al. ................. 342/70
2005/0092225 A1   5/2005 Kaji et al.

FOREIGN PATENT DOCUMENTS

| JP | 2001-91253 A  | 4/2001 |
| JP | 2001-133259 A | 5/2001 |
| JP | 2003-11761 A  | 1/2003 |
| JP | 2005-28891 A  | 2/2005 |
| JP | 2005-180949 A | 7/2005 |
| JP | 2005-212693 A | 8/2005 |

* cited by examiner

*Primary Examiner*—Sherman Basinger
(74) *Attorney, Agent, or Firm*—Keating & Bennett, LLP

(57) ABSTRACT

An apparatus for supporting docking of a marine vessel includes a distance measuring unit which measures a distance between the marine vessel and a candidate docking site, a distance measurement controlling unit which controls the distance measuring unit to measure distances between the marine vessel and at least three measurement points defined around the candidate docking site, a configuration evaluating unit which evaluates the configuration of the candidate docking site based on the distances between the marine vessel and the at least three measurement points, and a docking suitability judging unit which judges, based on the result of the evaluation, whether or not the candidate docking site is suitable for docking of the marine vessel.

11 Claims, 15 Drawing Sheets

DOCKING SUPPORTING APPARATUS, AND MARINE VESSEL INCLUDING THE APPARATUS

BACKGROUND OF THE INVENTION

1. Field of the Invention

The present invention relates to an apparatus for supporting docking of a marine vessel, and to a marine vessel including the apparatus. The term "docking" as used herein means that the marine vessel is brought into contact with a docking site (e.g., a pier, a wharf, a second marine vessel, or the like) or into close proximity to the docking site.

2. Description of the Related Art

A prior art technique for supporting a marine vessel maneuvering operation for docking a marine vessel is disclosed in Japanese Unexamined Patent Publication No. 2005-28891. According to the prior art technique, a pair of bitts (an object to be approached for docking) are provided on a wharf, and the marine vessel includes two pairs of automatic object tracking laser distance measuring apparatuses which each include a TV camera having an automatic tracking function and a laser distance sensor. The automatic object tracking laser distance measuring apparatus automatically tracks the bitts on the wharf, and constantly measures distances to the respective bitts. Based on the results of the measurement, the position of the marine vessel with respect to the wharf and the attitude and approaching speed of the marine vessel are computed, and the results of the computation are displayed on a display device. With reference to the display, an operator of the marine vessel controls bow side thrusters and stern pod propellers.

The prior art technique disclosed in Japanese Unexamined Patent Publication No. 2005-28891 is based on the assumption that the bitts are preliminarily provided on the wharf, and principally intended to support the docking of a large-scale marine vessel such as a large-scale ferry or a large-scale tanker. In the case of the large-scale marine vessel, a docking site (a site of a pier at which the marine vessel is to be docked) is predetermined according to a navigation schedule. Of course, the docking site is preliminarily selected so as to ensure safe docking of the large-scale marine vessel.

On the other hand, a small-scale marine vessel such as a cruiser, a fishing boat, a water jet, or a watercraft can berth in a narrow space in a harbor, so that it is rare to preliminarily assign a docking site to the small-scale marine vessel. Therefore, an operator of the small-scale marine vessel finds an available docking site in the harbor and, after visually checking the docking site for safety, docks the marine vessel at the site.

For example, the marine vessel may be re-docked at a docking site which is defined as a target docking position when the marine vessel leaves the docking site. However, if another marine vessel berths at that docking site, the target docking position should be changed. Of course, it is impossible to preliminarily determine a docking site in a harbor to be visited for the first time by the marine vessel. Further, a change in water depth due to tides may prevent the re-docking of the marine vessel at the docking site from which the marine vessel sets off.

For these reasons, the prior art technique disclosed in Japanese Unexamined Patent Publication No. 2005-28891 is not applicable to the support of the docking of the small-scale marine vessel. Therefore, whether or not the small-scale marine vessel can be safely docked at a docking site depends heavily on a judgment made by the operator of the marine vessel. Particularly, most leisure boat operators have insufficient marine vessel maneuvering skill and, therefore, often fail to make a proper judgment on the safe docking site.

SUMMARY OF THE INVENTION

In order to overcome the problems described above, a preferred embodiment of the present invention provides a docking supporting apparatus for supporting docking of a marine vessel, the apparatus including a distance measuring unit which measures a distance between the marine vessel and a candidate docking site, a distance measurement controlling unit which controls the distance measuring unit to measure distances between the marine vessel and at least three measurement points defined around the candidate docking site, a configuration evaluating unit which evaluates the configuration of the candidate docking site based on the distances between the marine vessel and the at least three measurement points measured by the distance measuring unit controlled by the distance measurement controlling unit, and a docking suitability judging unit which judges, based on a result of the evaluation made by the configuration evaluating unit, whether or not the candidate docking site is suitable for docking of the marine vessel.

With this arrangement, the distances between the marine vessel and the at least three measurement points defined around the candidate docking site are measured, and the configuration of the candidate docking site is evaluated based on the measured distances. Based on the evaluation result, whether or not the candidate docking site is suitable for docking of the marine vessel is judged. Thus, an operator of the marine vessel can properly judge whether or not the candidate docking site is suitable for docking, irrespective of the level of the operator's marine vessel maneuvering skill. Thus, selection of the suitable docking site can be facilitated and reliably performed. Therefore, the operator can reliably dock the marine vessel at a safe docking site.

As described above, it is practically impossible to preliminarily determine a suitable docking site for a small-scale marine vessel such as a cruiser, a fishing boat, a water jet, or a watercraft. Therefore, the docking of the marine vessel can be effectively supported by supporting the selection of the suitable docking site.

The configuration evaluating unit preferably includes a positional information computing unit which computes positional information of the at least three measurement points, and a regression process computing unit which determines a regression line and a regression error by performing a linear regression process on the positional information of the at least three measurement points computed by the positional information computing unit. In this case, the docking suitability judging unit is preferably arranged to judge that the candidate docking site is not suitable for docking if the regression error is greater than a predetermined threshold, and judge that the candidate docking site is suitable for docking if the regression error is not greater than the predetermined threshold.

With this arrangement, the regression line is determined for the at least three measurement points subjected to the distance measurement by the linear regression process. Further, whether or not the candidate docking site is suitable for docking is judged based on the regression error. That is, if the regression error is not greater than the threshold, it is judged that the at least three measurement points subjected to the distance measurement are substantially linearly arranged. Therefore, it is judged that the candidate docking site is suitable for docking. Thus, the candidate docking site which has a linear configuration or a substantially linear configuration can be selected as a docking site.

The regression error may be a sum of squares or a sum of absolute values of errors of the at least three measurement points with respect to the regression line.

The docking supporting apparatus preferably further includes an image pickup device which picks up an image of the candidate docking site, a display device which displays the image picked up by the image pickup device, and a candidate docking position specifying unit for an operator to specify a particular point as a candidate docking position in the image displayed on the display device. In this case, the distance measurement controlling unit is preferably arranged to use the candidate docking position specified by the candidate docking position specifying unit and at least two points defined within a predetermined azimuth angular range centering on the candidate docking position as the at least three measurement points.

With this arrangement, the image of the candidate docking site is picked up by the image pickup device and displayed on the display device, and the particular point in the image is specified as the candidate docking position. Upon the specification of the candidate docking position, the specified candidate docking position and the at least two points defined within the predetermined azimuth angular range (in a horizontal plane) centering on the candidate docking position are used as the at least three measurement points. Thus, an area around the candidate docking position specified by the operator of the marine vessel is subjected to a judgment of the suitability for docking. Therefore, the operator can dock the marine vessel at the suitable docking site with the aid of the judgment on the suitability of the candidate docking position arbitrarily selected by the operator.

The candidate docking position specifying unit may be a pointing device for specifying the particular point in the image displayed on the display device. Examples of the pointing device include a touch panel, a mouse, and a touch pad.

The docking supporting apparatus preferably further includes a target berthing position setting unit which sets a target berthing position at a position which is spaced a predetermined offset distance from the regression line determined by the regression process computing unit.

With this arrangement, the target berthing position (e.g., a target position at which the gravity center of the marine vessel is to be located) is set at the position spaced the predetermined offset distance from the regression line determined by the linear regression process (e.g., a position offset toward the current position of the marine vessel or a position spaced from a structure present at the candidate docking site). Therefore, the marine vessel is moved toward the target berthing position to thereby be safely docked without bumping against the structure (e.g., a pier, a wharf, or a second marine vessel) present at the docking site.

The target berthing position setting unit is preferably arranged to set the target berthing position on a line extending through the candidate docking position perpendicularly to the regression line. Thus, the marine vessel is berthed at the target berthing position to thereby be docked in proximity to the specified candidate docking position.

The offset distance may have a predetermined value (e.g., a value obtained by multiplying a half the length of the marine vessel by a safety factor (>1)). However, the target berthing position setting unit preferably includes a unit which determines the offset distance based on at least the length and width of the marine vessel (preferably further based on the azimuth of the marine vessel during the docking).

With this arrangement, the offset distance between the regression line and the target berthing position is determined based on the length and width of the marine vessel (i.e., the size of the marine vessel). Thus, the marine vessel is more reliably prevented from bumping against the structure present at the docking site, and the target berthing position is set sufficiently close to the candidate docking position.

The calculation of the offset distance is preferably further based on the azimuth (stem direction) of the marine vessel during the docking. Thus, the offset distance is determined based on the attitude of the marine vessel assumed when the marine vessel is moved toward the candidate docking site. Therefore, the target berthing position can be set in proximity to the candidate docking position, while the bumping of the marine vessel is reliably prevented.

The target berthing position setting unit is preferably arranged to nullify the setting of the target berthing position if the docking suitability judging unit judges that the candidate docking site is not suitable for docking of the marine vessel. The term "nullify" as herein used means that the computation of the target berthing position is not performed or that the target berthing position determined through the computation is cancelled.

With this arrangement, if the candidate docking site is not suitable for docking, the target berthing position is not set. In other words, the target berthing position is not set for a candidate docking site that is unlikely to ensure the safe docking. Therefore, the marine vessel can be reliably berthed in a safe area.

The docking supporting apparatus preferably further includes a unit which causes the display unit to display a message that the setting of the target berthing position is nullified (cancelled). Thus, the operator can immediately recognize that the candidate docking site is not suitable for docking.

The docking supporting apparatus preferably further includes a position detecting unit which detects the position of the marine vessel and generates marine vessel positional information, a map storage unit which stores map information on a marine vessel navigable area, a map display unit which displays the map information, and a display controlling unit which reads out a portion of the map information related to the marine vessel positional information generated by the position detecting unit from the map storage unit and causes the map display unit to display the portion of the map information.

The display controlling unit is preferably arranged to cause the map display unit to display the read map information together with the target berthing position set by the target berthing position setting unit. With this arrangement, the target berthing position is indicated in the map, so that the target berthing position can be easily found. Thus, the docking operation can be more effectively supported.

The display controlling unit is preferably arranged to cause the map display unit to display the marine vessel positional information as well. With this arrangement, the operator can more easily understand a relationship between the position of the marine vessel and the target berthing position, so that the docking operation can be more effectively supported.

The docking supporting apparatus preferably further includes a water depth measuring unit which measures a water depth of a water area around the marine vessel. In this case, the display controlling unit is preferably arranged to cause the map display unit to display information on the water depth measured by the water depth measuring unit.

With this arrangement, the water depth information is also displayed on the map display unit. This makes it possible to perform the marine vessel maneuvering operation while checking if the marine vessel can be navigated to the target berthing position in a water area having sufficient water depths. Thus, the docking operation can be more effectively supported.

Another preferred embodiment of the present invention provides a marine vessel including a hull, and the aforementioned docking supporting apparatus which is mounted in the hull. With this arrangement, the marine vessel can be smoothly berthed at a safe docking site.

Other features, elements, processes, steps, characteristics and advantages of the present invention will become more apparent from the following detailed description of preferred embodiments of the present invention with reference to the attached drawings.

DETAILED DESCRIPTION OF PREFERRED EMBODIMENTS

1. Construction of Marine Vessel

Figure 1:
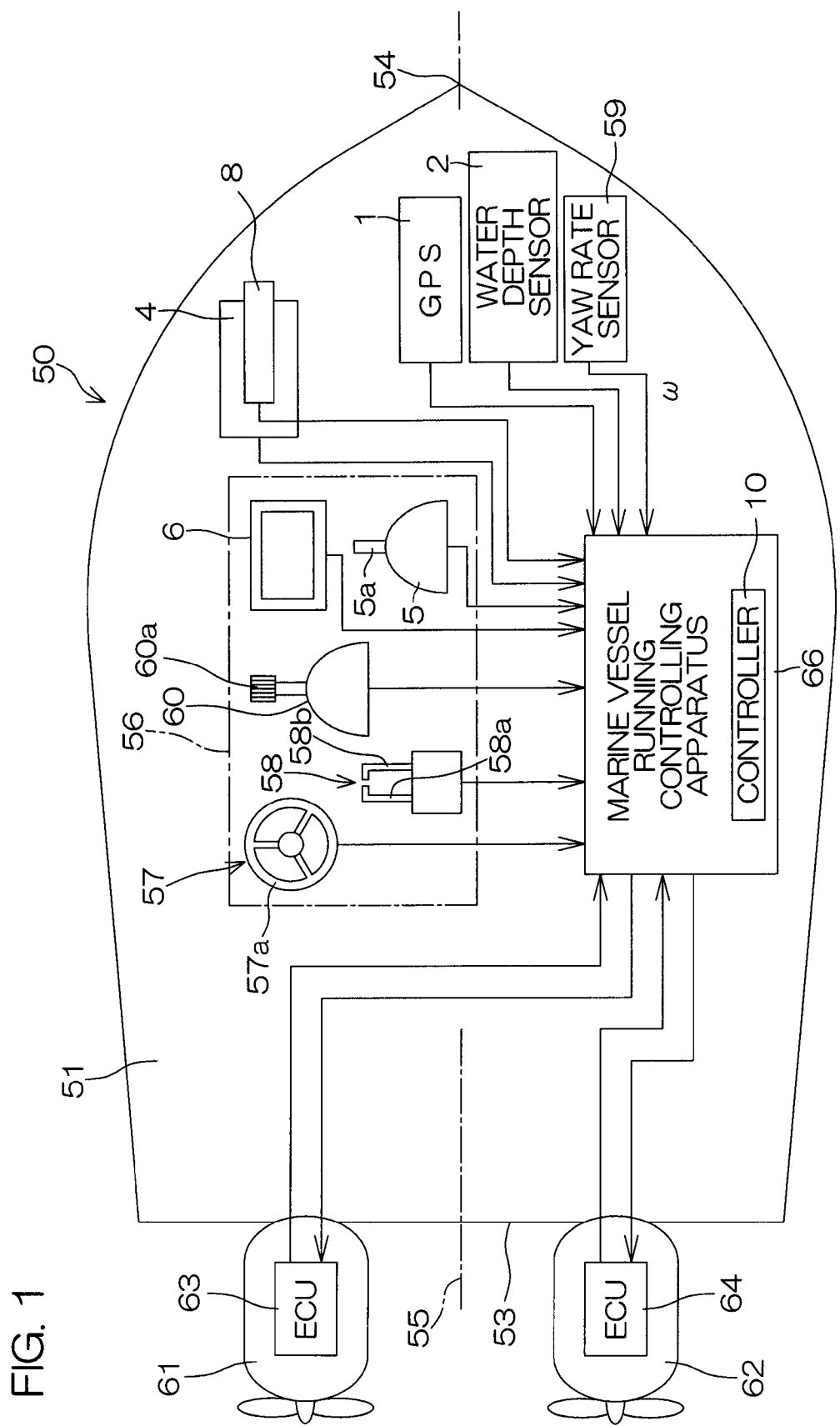
FIG. 1 is a conceptual diagram for explaining the construction of a marine vessel according to one preferred embodiment of the present invention.

FIG. 1 is a conceptual diagram for explaining the construction of a marine vessel according to one preferred embodiment of the present invention. The marine vessel 50 is preferably a relatively small-scale marine vessel such as a cruiser or a boat. The marine vessel 50 preferably includes a pair of outboard motors 61, 62 attached to a stern (transom) 53 of a hull 51 thereof. The outboard motors 61, 62 are positioned laterally and symmetrically with respect to a center line 55 of the hull 51 extending through the stern 53 and a bow 54 of the hull 51. That is, the outboard motor 61 is attached to a rear port-side portion of the hull 51, while the outboard motor 62 is attached to a rear starboard-side portion of the hull 51. Electronic control units 63 and 64 (hereinafter referred to as "outboard motor ECU 63" and "outboard motor ECU 64", respectively) are incorporated in the port-side outboard motor 61 and the starboard-side outboard motor 62, respectively.

A control console 56 is provided in the hull 51 for maneuvering the marine vessel 50. The control console 56 includes, for example, a steering operational section 57 for performing a steering operation, a throttle operational section 58 for controlling the outputs of the outboard motors 61, 62, and a lateral movement operational section 60 for laterally moving the marine vessel 50 while maintaining the hull 51 at a constant turning angular speed (at a bow turning speed of zero, for example). The steering operational section 57 includes a steering wheel 57a as an operation member. The throttle operational section 58 includes throttle levers 58a, 58b for the respective outboard motors 61, 62. In this preferred embodiment, the lateral movement operational section 60 is preferably a joystick type input device which includes an upright operation lever 60a.

The operations of the respective operational sections provided on the control console 56 are input as electric signals to a marine vessel running controlling apparatus 66, for example, via a LAN (local area network, hereinafter referred to as "inboard LAN") provided in the hull 51. The marine vessel running controlling apparatus 66 includes an electronic control unit (ECU) including a microcomputer, and functions as a propulsive force controlling apparatus for propulsive force control, as a steering controlling apparatus for steering control and as a controller 10 (docking support controlling apparatus) for supporting the docking operation of the marine vessel 50. A yaw rate sensor 59 for detecting the angular speed (yaw rate or bow turning speed) of the hull 51 outputs an angular speed signal, which is also input to the marine vessel running controlling apparatus 66 via the inboard LAN.

The marine vessel running controlling apparatus 66 communicates with the outboard motor ECUs 63, 64 via the inboard LAN. More specifically, the marine vessel running controlling apparatus 66 acquires engine speeds (rotational speeds) of the outboard motors 61, 62 and steering angles of the outboard motors 61, 62 indicating the orientations of the outboard motors 61, 62 from the outboard motor ECUs 63, 64. The marine vessel running controlling apparatus 66 applies data including target steering angles, target throttle opening degrees, target shift positions (forward drive, neutral, and reverse drive positions), and target trim angles to the outboard motor ECUs 63, 64.

In this preferred embodiment, the marine vessel running controlling apparatus 66 includes a control mode to be switched between an ordinary running mode in which the outboard motors 61, 62 are controlled according to the operations of the steering operational section 57 and the throttle operational section 58 and a lateral movement mode in which the outboard motors 61, 62 are controlled according to the operation of the lateral movement operational section 60. More specifically, the marine vessel running controlling apparatus 66 is operative in the ordinary running mode when an input from the steering operational section 57 or the throttle operational section 58 is detected, and is operative in the lateral movement mode when the operation of the lateral movement operational section 60 is detected.

In the ordinary running mode, the marine vessel running controlling apparatus 66 controls the outboard motors 61, 62 according to the operation of the steering wheel 57a such that the steering angles of the outboard motors 61, 62 are substantially equal to each other. That is, the outboard motors 61, 62 generate propulsive forces that are substantially parallel with each other. In the ordinary running mode, the marine vessel running controlling apparatus 66 determines the target throttle opening degrees and the target shift positions of the outboard motors 61, 62 according to the operation amounts and directions of the throttle levers 58a, 58b. The throttle levers 58a, 58b respectively correspond to the port-side and starboard-side outboard motors 61, 62.

In the lateral movement mode, the marine vessel running controlling apparatus 66 sets the target steering angles, the target shift positions, and the target throttle opening degrees of the port-side and starboard-side outboard motors 61, 62 according to the operation of the lateral movement operational section 60. Thus, the marine vessel 50 is horizontally moved, for example, without the turning of the stem. A control operation in the lateral movement mode is described, for example, in United States Patent Application Publication No. 2005/0092225 A1, now U.S. Pat. No. 6,994,042, the disclosure of which is incorporated herein by reference.

The marine vessel 50 further includes a docking supporting apparatus mounted on the hull 51 thereof. The docking supporting apparatus is adapted to support a target berthing position determining operation for determining a proper target berthing position when the marine vessel 50 is docked at a docking site and berthed. Examples of the docking site include a pier, a wharf, and a second marine vessel, but are not limited to these examples.

2. Construction of Docking Supporting Apparatus

Figure 2:
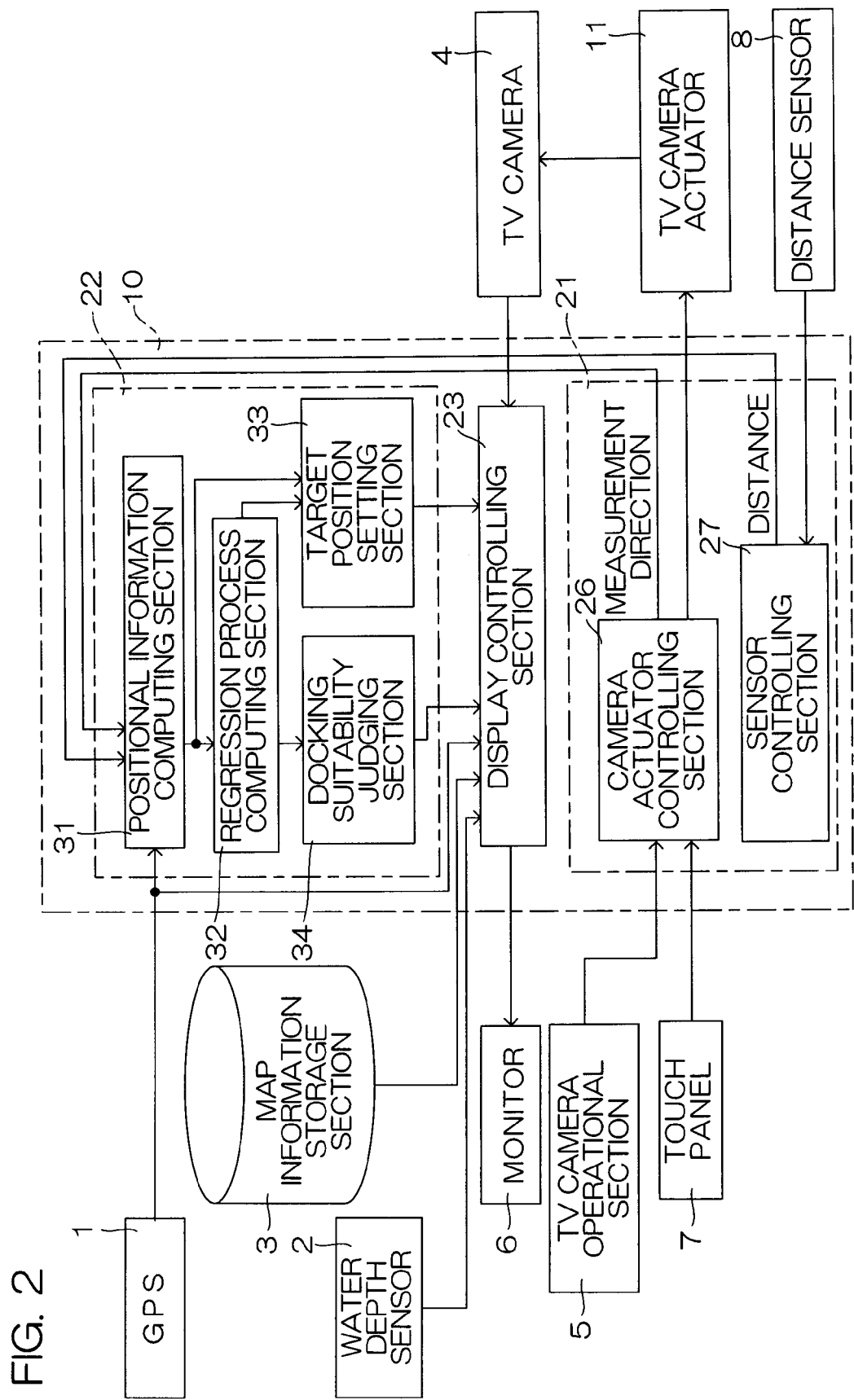
FIG. 2 is a block diagram for explaining the electrical construction of a docking supporting apparatus.

FIG. 2 is a block diagram for explaining the electrical construction of the docking supporting apparatus. The docking supporting apparatus includes a GPS (Global Positioning System) 1 as a position detecting unit, a water depth sensor 2 as a water depth measuring unit for measuring the water depth of a water area around the marine vessel 50, a map information storage section 3 as a map storage unit in which a marine chart is stored, a TV camera 4 as an image pickup device for picking up an image of the water area around the marine vessel 50, a TV camera operational section 5 (e.g., a joy stick having a laterally, forwardly, and backwardly inclinable lever 5a, see FIG. 1) for operating the TV camera 4, a monitor 6 as a display device (doubling as a map display unit), a touch panel 7 (candidate docking position specifying unit) as an input operational section disposed on a screen of the monitor 6, a distance sensor 8 as a distance measuring unit for measuring distances between the marine vessel 50 and a plurality of measurement points including a target position specified by operating the touch panel 7, and the controller 10. The TV camera 4 is attached to the marine vessel 50 such that it is movable in a horizontal plane and a vertical plane. The TV camera operational section 5 and the monitor 6 are provided, for example, on the control console 56 (see FIG. 1). The controller 10 is implemented by the function of the marine vessel running controlling apparatus 66.

The docking supporting apparatus further includes a TV camera actuator 11 for driving the TV camera 4 to change an aiming direction (an azimuth angle and an elevation/depression angle) of the TV camera 4. The TV camera operational section 5 is a remote controller for controlling the TV camera actuator 11. The GPS 1 detects the current position of the marine vessel 50 by receiving radio waves from a GPS satellite, and generates positional data indicating the current marine vessel position. The positional data includes latitude data and longitude data.

In this preferred embodiment, the distance sensor 8 is fixed integrally to the TV camera 4 so that its measurement direction is changed according to the operation of the TV camera 4.

The positional data from the GPS 1, water depth data from the water depth sensor 2, map data from the map information storage section 3, operational data from the TV camera operational section 5, operation positional data from the touch panel 7, and distance data from the distance sensor 8 are input to the controller 10. The controller 10 executes predetermined programs to function as a plurality of functional sections. The functional sections include a distance measurement controlling section 21 (distance measurement controlling unit) which controls a distance measuring operation of the distance sensor 8, a target berthing position setting section 22 which performs a computation for setting the target berthing position, and a display controlling section 23 (display controlling unit) which performs a display controlling operation for displaying the map and other information on the screen of the monitor 6.

The distance measurement controlling section 21 includes a camera actuator controlling section 26 for controlling the TV camera actuator 11, and a sensor controlling section 27 which controls the distance detecting operation of the distance sensor 8. In this preferred embodiment, the camera actuator controlling section 26 controls the TV camera actuator 11 according to the operation of the TV camera operational section 5 and according to a candidate docking position specified by operating the touch panel 7. The sensor controlling section 27 functions to control the distance sensor 8, when required, to perform the distance measuring operation and sample the results of the measurement. The distance measurement controlling section 21 measures distances between the marine vessel 50 and at least three measurement points including the candidate docking position specified via the touch panel 7 to generate the distance data by the action of the camera actuator controlling section 26 and the sensor controlling section 27. The distance measurement controlling section 21 applies the generated distance data and measurement azimuth data indicating the measurement direction of the distance sensor 8 (which coincides with the aiming direction of the TV camera 4) for the respective measurement points to the target berthing position setting section 22.

The target berthing position setting section 22 includes a positional information computing section 31 (positional information computing unit) which computes positional information of the respective measurement points, a regression process computing section 32 (regression process computing unit) which performs a linear regression process on the resulting positional information, a target position setting section 33 (target berthing position setting unit) which sets the target berthing position based on the result of the regression process computation, and a docking suitability judging section 34 (docking suitability judging unit) which judges whether or not the candidate docking position specified via the touch panel 7 is suitable.

The positional information computing section 31 generates positional data for the at least three measurement points based on the current position of the marine vessel 50 detected by the GPS 1, and the measurement azimuth data and the distance data applied from the distance measurement controlling section 21. The regression process computing section 32 performs the linear regression process on the positional data to determine a regression line for approximation of the arrangement of the measurement points and a regression error based on errors of the respective measurement points with respect to the regression line. In this preferred embodiment, the sum of squares of the errors is preferably used as the regression error, but the sum of absolute values of the errors may be used as the regression error. The target position setting section 33 acquires data on the regression line from the regression process computing section 32, and acquires the positional data of the candidate docking position from the positional information computing section 31. Then, the target position setting section 33 sets the target berthing position of the marine vessel 50 based on the regression line data, the positional data of the candidate docking position, and data on the length and width of the marine vessel 50. The docking suitability judging section 34 acquires the sum of the squares of the errors from the regression process computing section 32, and judges whether or not a plurality of the measurement points are aligned. If the plurality of the measurement points are substantially aligned, it is judged that a structure present around the candidate docking position is suitable for docking with smaller undulations. On the other hand, if the measurement points are not aligned, the structure present around the candidate docking position has greater undulations, thereby possibly failing to ensure safe docking of the marine vessel 50. Therefore, it is judged that the candidate docking position is not suitable for docking. In this case, the monitor 6 is operated to display a message that the target position is not set.

The display controlling section 23 reads out a marine chart around the current position of the marine vessel 50 from the map information storage section 3 on the basis of the positional information from the GPS 1, and causes the monitor 6 to display the marine chart. Further, the display controlling section 23 acquires the water depth data from the water depth sensor 2, and causes the monitor 6 to display water depth information (for example, numerically display the water depth information). In addition, the display controlling section 23 causes the monitor 6 to display the target berthing position set by the target berthing position setting section 22. When the target berthing position setting section 22 does not set the target position, the display controlling section 23 causes the monitor 6 to display a message that the specified candidate docking position is not suitable for docking. In addition to the aforementioned information, information on tides, and other information may be displayed on the monitor 6. In consideration of the water depth information and the tidal information, an operator can more accurately judge whether or not it is possible to safely navigate the marine vessel 50 to the target berthing position.

Figure 3:
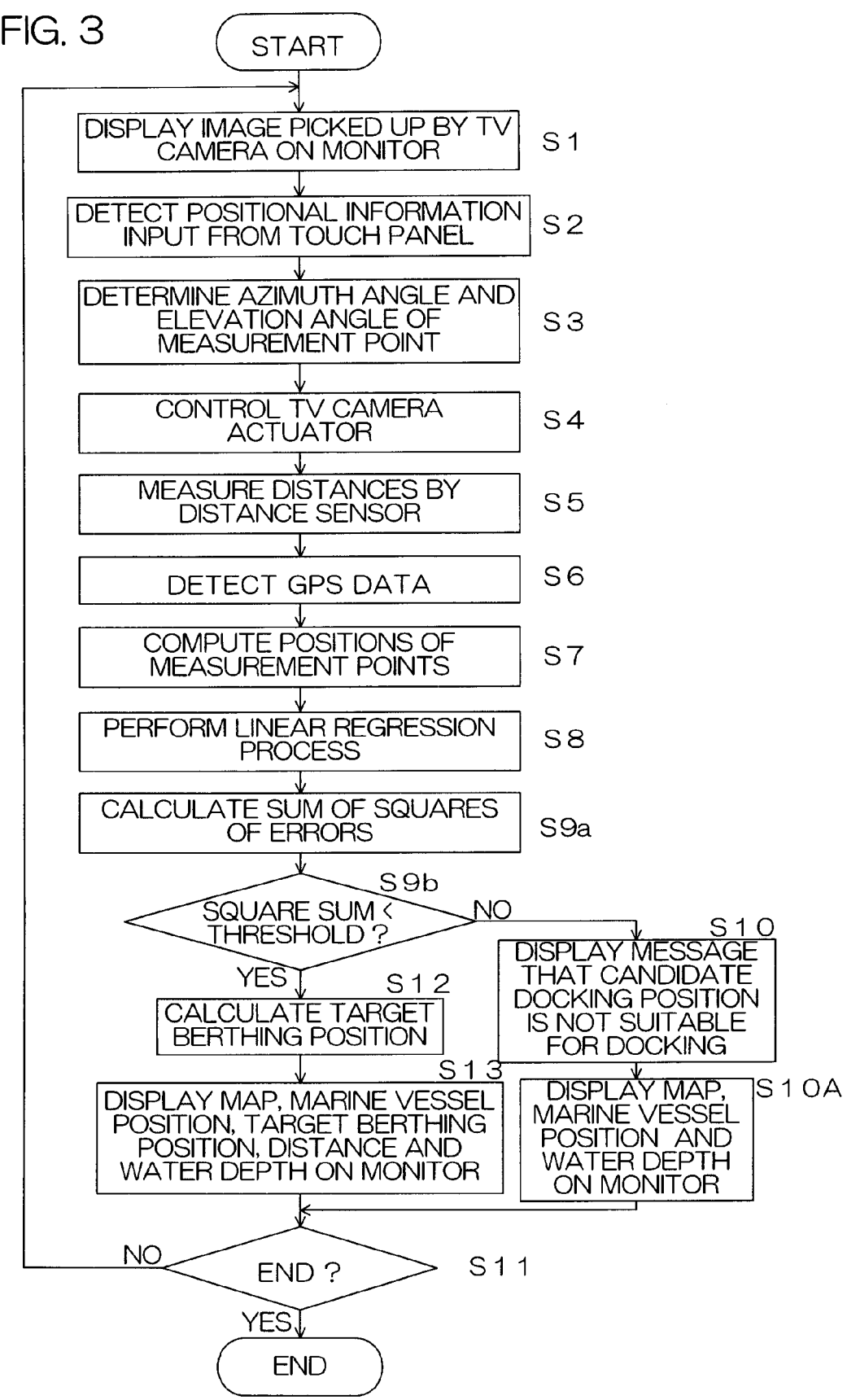
FIG. 3 is a flow chart for explaining the flow of a process to be performed for specifying a candidate docking position and setting a target berthing position.

FIG. 3 is a flow chart for explaining the flow of a process to be performed for specifying the candidate docking position of the marine vessel 50 and setting the target berthing position.

When the operator inputs a command to start a target berthing position setting operation (for example, by pressing a target berthing position setting button displayed on the monitor 6), the display controlling section 23 displays an image picked up by the TV camera 4 on the monitor 6 (Step S1). While viewing the image displayed on the monitor 6, the operator operates the TV camera operational section 5 to display an image of a candidate docking site on the monitor 6.

With the image of the candidate docking site being displayed on the monitor 6, the operator operates the touch panel 7. That is, the operator touches a candidate docking position in the image displayed on the monitor 6. The touch panel 7 detects the touched position (Step S2), and applies positional information of the touched position to the camera actuator controlling section 26.

When the positional information is applied from the touch panel 7, the camera actuator controlling section 26 computes an azimuth angle $\theta 1$ and an elevation angle (or depression angle) $\psi 1$ (see FIG. 8) indicating the direction of the candidate docking position (see FIGS. 6, 10 and 11) defined as a first measurement point 81, based on the azimuth angle and elevation angle (or depression angle) of the aiming direction of the TV camera 4 observed at that time and the positional information applied from the touch panel 7 (Step S3). In this case, the azimuth angle $\theta$ is an angle of the aiming direction of the TV camera 4 with respect to a bow direction (extending along the marine vessel center line 55 to the bow 54, see FIG. 1) in a horizontal plane, and the elevation angle $\psi$ is an angle of the aiming direction of the TV camera 4 with respect to the horizontal plane. In general, an angle of $\psi>0$ is called "elevation angle", and an angle of $\psi<0$ is called "depression angle". Here, these angles and an angle of $\psi=0$ are generally called "elevation angle".

Further, the camera actuator controlling section 26 determines azimuth angles $\theta 2$, $\theta 3$ and elevation angles $\psi 2$, $\psi 3$ of second and third measurement points 82, 83 (see FIGS. 6, 8, 10 and 11). More specifically, the second and third measurement points 82, 83 are two different points spaced a predetermined angle $\gamma$ from the first measurement point 81. That is, $\theta 2=\theta 1-\gamma$, $\theta 3=\theta 1+\gamma$, $\psi 2=\psi 3=\psi 1$. The angle $\gamma$ is preferably, for example, about 10 degrees.

The camera actuator controlling section 26 controls the TV camera actuator 11 based on the azimuth angles $\theta 1$ to $\theta 3$ and the elevation angles $\psi 1$ to $\psi 3$ of the first, second, and third measurement points 81, 82, 83 computed in the aforementioned manner. Thus, the TV camera 4 and the distance sensor 8 fixed integrally to the TV camera 4 are directed to the first, second, and third measurement points 81 to 83 in sequence (Step S4).

On the other hand, the sensor controlling section 27 samples distance data L1, L2, L3 detected by the distance sensor 8 when the distance sensor 8 is directed to each of the first to third measurement points 81 to 83 (Step S5). The distance data L1, L2, L3 is applied to the target berthing position setting section 22.

The positional information computing section 31 provided in the target berthing position setting section 22 acquires information on the current position of the marine vessel 50 from the GPS 1 (Step S6), the data on the azimuth angles $\theta 1$ to $\theta 3$ and the elevation angles $\psi 1$ to $\psi 3$ of the first to third measurement points 81 to 83 from the camera actuator controlling section 26 and the distance data L1, L2, L3 from the sensor controlling section 27. Based on the information thus acquired, the positional information computing section 31 computes the positional information of the first to third measurement points 81 to 83 (Step S7).

Information on the computed positions is applied to the regression process computing section 32. The regression process computing section 32 performs the linear regression process on the positional information of the first to third measurement points 81 to 83 (Step S8) to determine a regression line A which most closely approximates the first to third measurement points 81 to 83 (see FIG. 11). Further, the regression process computing section 32 computes the sum SSE ($=\epsilon_1^2+\epsilon_2^2+\epsilon_3^2$) of squares of errors $\epsilon_1$, $\epsilon_2$, $\epsilon_3$ (see FIG. 11A) of the first to third measurement points 81 to 83 with respect to the regression line A (Step S9a).

The docking suitability judging section 34 compares the sum SSE of the squares of the errors with a predetermined threshold Th (Step S9b). If the sum SSE of the squares of the errors is greater than the threshold Th, it is judged that the candidate docking position 81 specified via the touch panel 7 by the operator is not suitable for docking, and this judgment result is applied to the display controlling section 23. Upon reception of the judgment result, the display controlling section 23 causes the monitor 6 to display the message that the candidate docking position 81 is not suitable for docking (Step S10). In this case, the display controlling section 23 acquires the data on the current marine vessel position detected by the GPS 1 and the data on the map around the current marine vessel position from the map information storage section 3, and further acquires the data on the water depth detected by the water depth sensor 2. The display controlling section 23 causes the monitor 6 to display the acquired data (Step S10A).

If the operator specifies another candidate docking position, a process sequence from Step S1 is repeated. If the operator performs a predetermined operation for ending the target berthing position setting operation (for example, by pressing an end button displayed on the monitor 6), the process ends (Step S11).

On the other hand, if the square sum SSE of the errors is not greater than the threshold Th (Step S9b), the docking suitability judging section 34 judges that the specified candidate docking position 81 is suitable for docking. In this case, the target position setting section 33 sets the target berthing position (Step S12).

Then, the display controlling section 23 acquires data on the set target berthing position from the target position setting section 33, the data on the current marine vessel position detected by the GPS 1, and the data on the map around the current marine vessel position from the map information storage section 3, and further acquires the data on the water depth detected by the water depth sensor 2. The display controlling section 23 causes the monitor 6 to display the acquired data as well as the data on the distance to the target berthing position (Step S13).

Figure 4A:
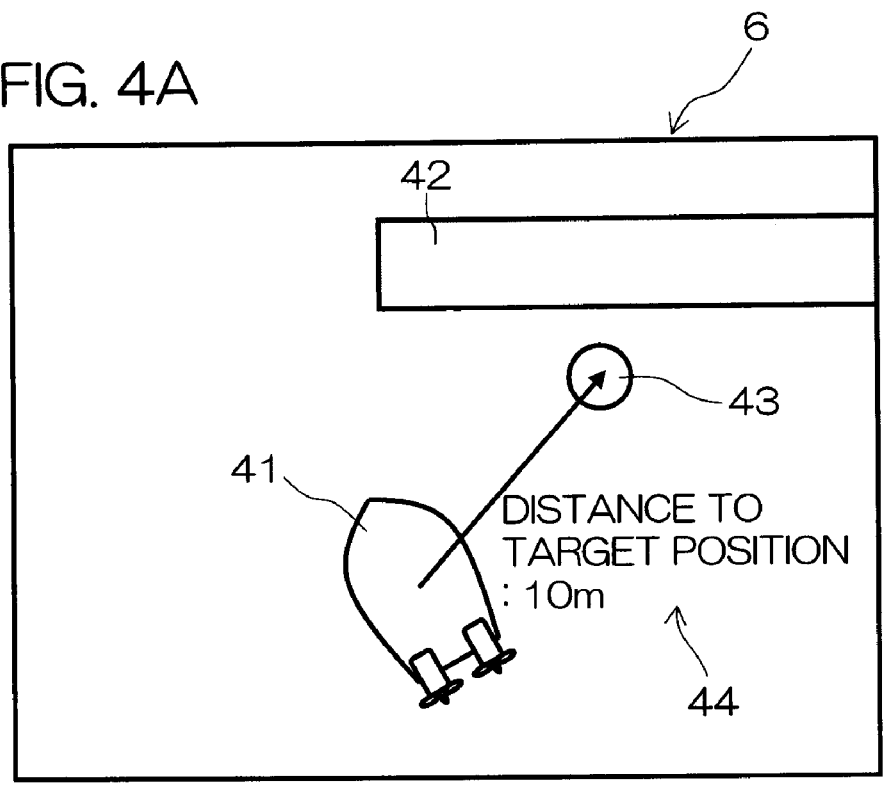
FIGS. 4A and 4B respectively illustrate exemplary screen images displayed on a monitor, particularly, FIG. 4A illustrating an exemplary screen image of a map in an overhead view, and FIG. 4B illustrating an exemplary screen image of a map in a perspective view.
Figure 4B:
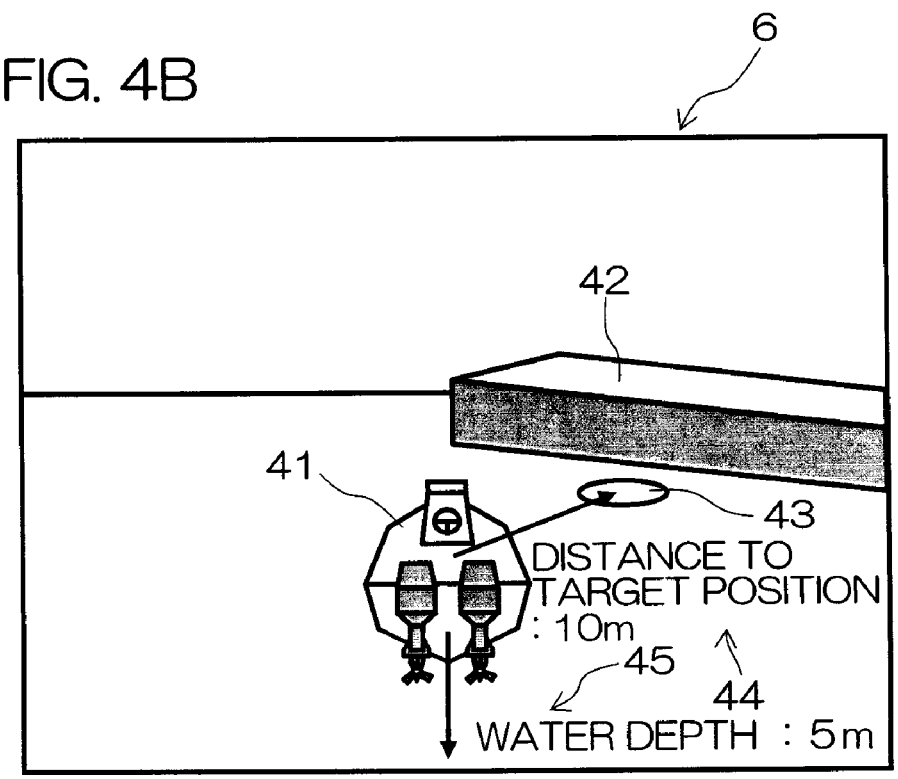

FIGS. 4A and 4B respectively illustrate exemplary screen images displayed on the monitor 6. Particularly, FIG. 4A illustrates an exemplary screen image of a map in an overhead view, and FIG. 4B illustrates an exemplary screen image of a map in a perspective view. The map is displayed as a background image, and the position of the marine vessel 50 is indicated on the background image by a marine vessel mark 41 (which is displayed at a lower middle position in the screen in this case). Further, a graphical indication 42 of a nearby structure (a pier, a wharf, or the like) and a target berthing position mark 43 are displayed on the background image. In addition, an indication 44 of the distance to the target berthing position and an indication 45 of the water depth (see the map shown in the perspective view in FIG. 4B) are displayed on the background image. The display controlling section 23 constantly updates the map, the distance indication and the water depth indication according to the movement of the marine vessel 50.

The operator guides the marine vessel 50 to the target berthing position by performing the marine vessel maneuvering operation (by operating the steering operational section 57, the throttle operational section 58, and the lateral movement operational section 60) while viewing the display of the monitor 6. Thus, the marine vessel 50 can be moved toward the target berthing position to be reliably docked.

Figure 5:
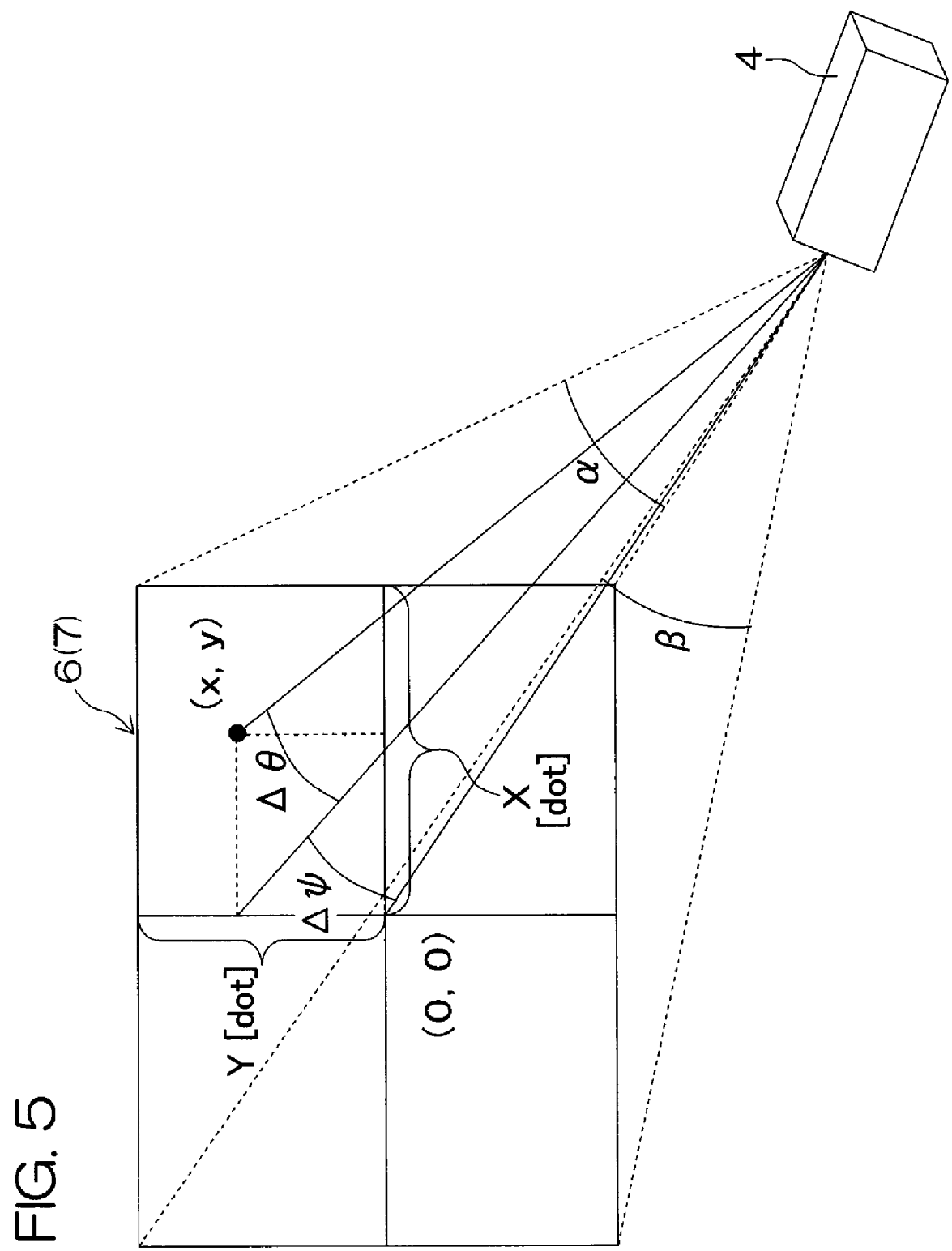
FIG. 5 is a schematic diagram for explaining principles for determining the aiming direction of a TV camera according to the candidate docking position.

FIG. 5 is a schematic diagram for explaining principles for determining the azimuth angle θ and the elevation angle ψ of the aiming direction of the TV camera 4 (which is equivalent to the measurement direction of the distance sensor 8 in this preferred embodiment) according to the candidate docking position specified by the touch panel 7.

It is herein assumed that the TV camera 4 has a horizontal view angle α and a vertical view angle β, and the touch panel 7 is capable of detecting a position on the display screen of the monitor 6 with a horizontal resolution of 2X dots and a vertical resolution of 2Y dots. Assuming a coordinate plane having an origin (0,0) located at the center of the monitor 6, the origin (0,0) corresponds to the aiming direction of the TV camera 4.

In this case, coordinates (x,y) on the monitor 6 are specified as the candidate docking position. The aiming direction of the TV camera 4 is changed so that the candidate docking position coincides with the origin (0,0). Thus, the TV camera 4 and the distance sensor 8 fixed to the TV camera 4 are directed to the candidate docking position. That is, the TV camera 4 is pivoted horizontally by $\Delta\theta$ (=0.5αx/X) and vertically by $\Delta\psi$ (=0.5βy/Y). More specifically, the target azimuth angle θ* of the TV camera 4 has a value obtained by adding $\Delta\theta$ to the current azimuth angle θ, and the target elevation angle ψ* of the TV camera 4 has a value obtained by adding $\Delta\psi$ to the current elevation angle ψ. That is, θ*=θ+$\Delta\theta$ and ψ*=ψ+$\Delta\psi$.

The camera actuator controlling section 26 performs this computation, and controls the TV camera actuator 11 based on the target azimuth angle θ* and the target elevation angle ψ*.

3. Algorithm for Computing Position Vectors of Measurement Points

An algorithm for computing position vectors of the respective measurement points will hereinafter be explained.

3-1. Definition of Coordinate Systems

For explanation purposes, three coordinate systems, i.e., a hull coordinate system, a local coordinate system, and an ECFE coordinate system are defined as follows.

Figure 6:
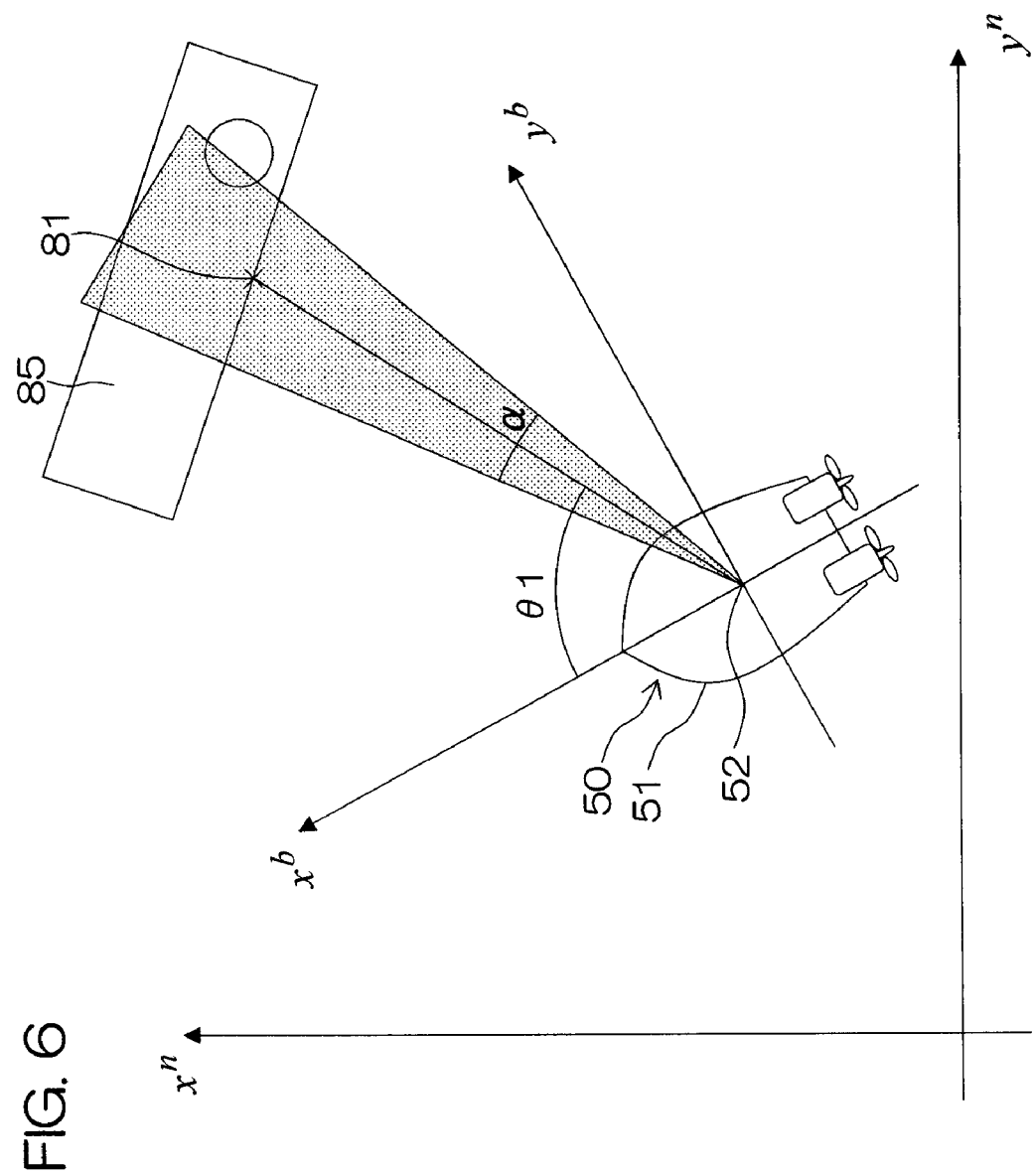
FIG. 6 is a diagram for explaining a hull coordinate system.

Hull coordinate system (body axis): A coordinate system having an origin defined by a gravity center 52 of the hull 51, an x-axis extending in the bow direction, a y-axis extending in a starboard-side direction and a z-axis extending downward as shown in FIG. 6. It is herein assumed that z=0 (the marine vessel 50 is moved in a horizontal plane), and a consideration is given only to the horizontal movement of the marine vessel 50 within an xy-plane. Variables defined in the hull coordinate system are herein suffixed with "b".

Figure 7:
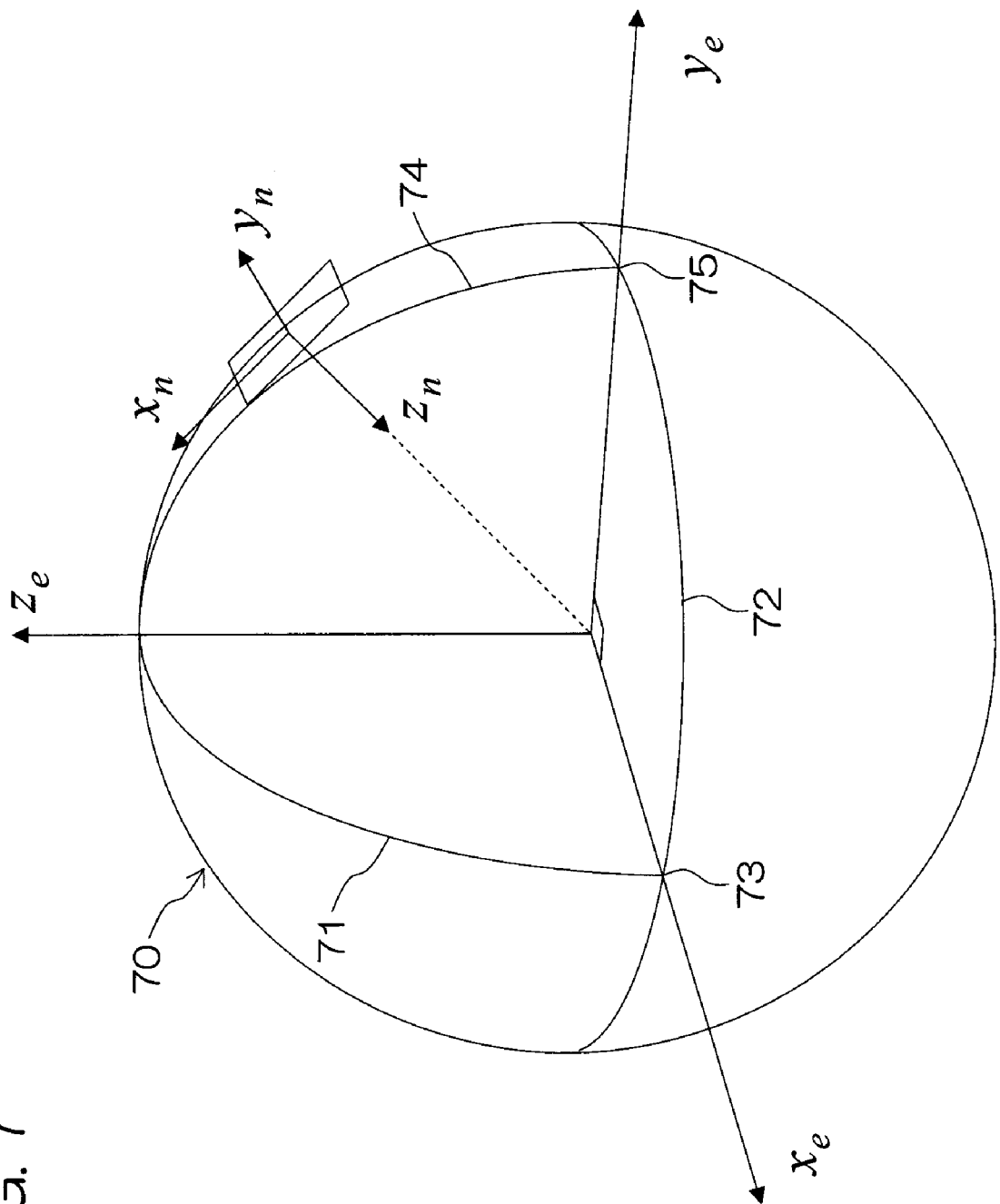
FIG. 7 is a diagram for explaining a local coordinate system and an ECEF coordinate system.

Local coordinate system (North-East-Down axes): A coordinate system having an origin defined by a given point on the earth 70, an x-axis extending to the north, a y-axis extending to the east and a z-axis extending downward as shown in FIG. 7. It is herein assumed that z=0 (the marine vessel 50 is moved in a horizontal plane), and consideration is given only to the horizontal movement of the marine vessel 50 within an xy-plane. Variables defined in the local coordinate system are herein suffixed with "n".

ECEF coordinate system (Earth-Centered Earth-Fixed axis): A coordinate system having an origin defined by the gravity center of the earth 70, an x-axis extending through a point 73 at which the Greenwich meridian 71 intersects the equator 72, a y-axis extending through a point 75 at which a 90-degree east longitude meridian 74 intersects the equator 72, and a z-axis extending along the axis of the earth toward the North Pole. Variables defined in the ECEF coordinate system are herein suffixed with "e".

3-2. Algorithm

3-2-1. Step 1: Computation of Marine Vessel Position Vector Pn in Local Coordinate System Based on the world geodesic system WGS-84, the GPS 1 outputs latitude/longitude data $\Psi=(\nu,\mu)$ (wherein $\nu$ is a latitude and $\mu$ is a longitude) of the current position of the marine vessel 50. The positional information computing section 31 transforms the latitude/longitude data into a marine vessel position vector $P^e$ in the ECEF coordinate system by the following expressions:

$$P^e = \begin{bmatrix} x_e \\ y_e \\ z_e \end{bmatrix} = \begin{bmatrix} (N+h)\cos\mu\cos\nu \\ (N+h)\cos\mu\sin\nu \\ (r_p^2/r_e^2 \cdot N + h)\sin\mu \end{bmatrix} \quad (1)$$

$$N = \frac{r_e^2}{\sqrt{r_e^2\cos^2\mu + r_p^2\sin^2\mu}} \quad (2)$$

wherein N is an elliptic cylinder height of the earth, h is a height of the marine vessel from a water surface in the hull coordinate system, $r_e$ is an equatorial radius, and $r_p$ is a polar radius. In this preferred embodiment, it is assumed that the marine vessel 50 moves on the water surface, so that h=0.

Further, the positional information computing section 31 transforms the marine vessel position vector $P^e$ in the ECEF coordinate system into a marine vessel position vector $P^n$ in the local coordinate system which has an origin defined by a given position vector expressed by $O^e=(x_0,y_0,z_0)$ in the ECEF coordinate system. The following expressions are used for the transformation:

$$P^n = R_e^n(\Psi)(P^e - O^e) \quad (3)$$

$$R_e^n(\Psi) = \begin{bmatrix} -\cos\nu\sin\mu & -\sin\nu\sin\mu & \cos\mu \\ -\sin\nu & \cos\nu & 0 \\ -\cos\nu\cos\mu & -\sin\nu\cos\mu & -\sin\mu \end{bmatrix} \quad (4)$$

wherein $R^n_e(\Psi)$ is a transformation matrix from the ECEF coordinate system to the local coordinate system. In this preferred embodiment, a consideration is given only to in-plane positional relationships in the local coordinate system and the hull coordinate system, so that an element $Z_n$ of the obtained marine vessel position vector $P^n$ is $Z_n=0$. The marine vessel position vector $P^n$ is a position vector of the origin of the hull coordinate system (the gravity center 52 of the marine vessel 50) viewed from the local coordinate system.

Figure 8:
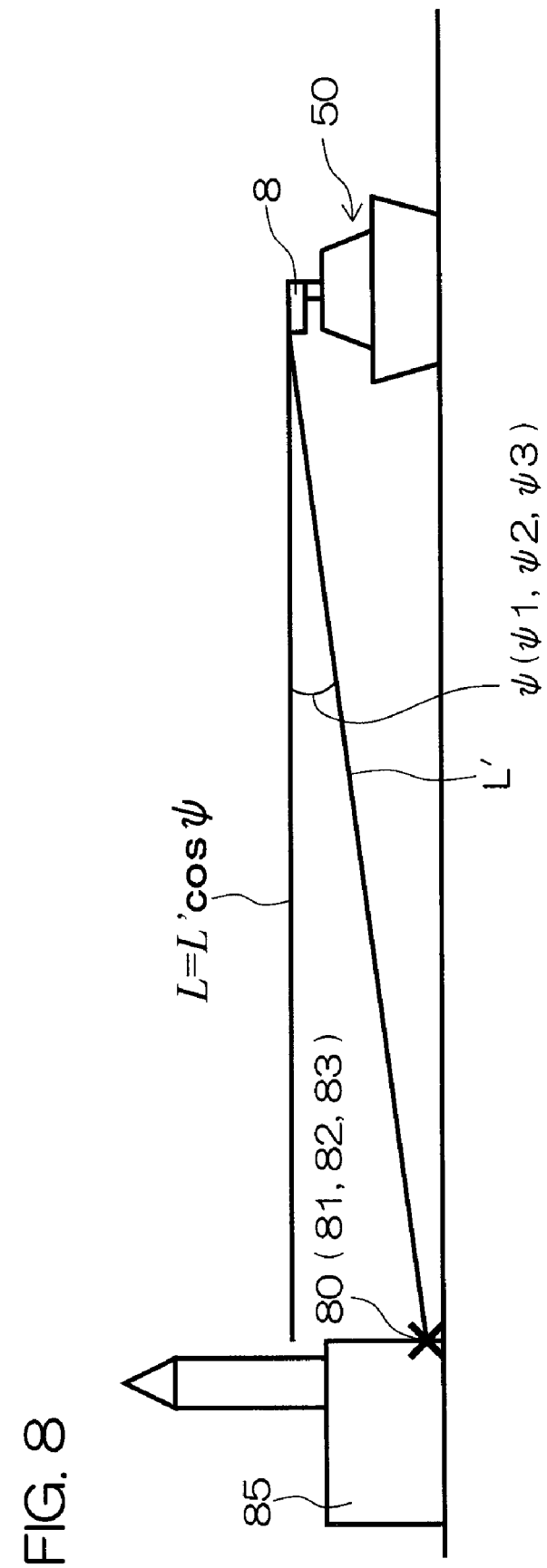
FIG. 8 is a schematic diagram for explaining a distance measuring operation to be performed by a distance sensor.

3-2-2. Step 2: Computation of Measurement Point Position Vectors $r^n$ in Local Coordinate System The positional information computing section 31 first determines a position vector $r^b$ of each of the measurement points in the hull coordinate system, based on the azimuth angle $\theta$ of the measurement direction of the distance sensor 8 (which is equivalent to the azimuth angle of the aiming direction of the TV camera 4 in this preferred embodiment) and the distance L determined from the output of the distance sensor 8. Where the distance sensor 8 outputs a distance L', the distance (horizontal distance) between the hull 51 and the measurement point 80 (any of the first to third measurement points 81 to 83) is L=L' cos $\psi$ as shown in FIG. 8. This computation is performed by the distance measurement controlling section 21.

Figure 9:
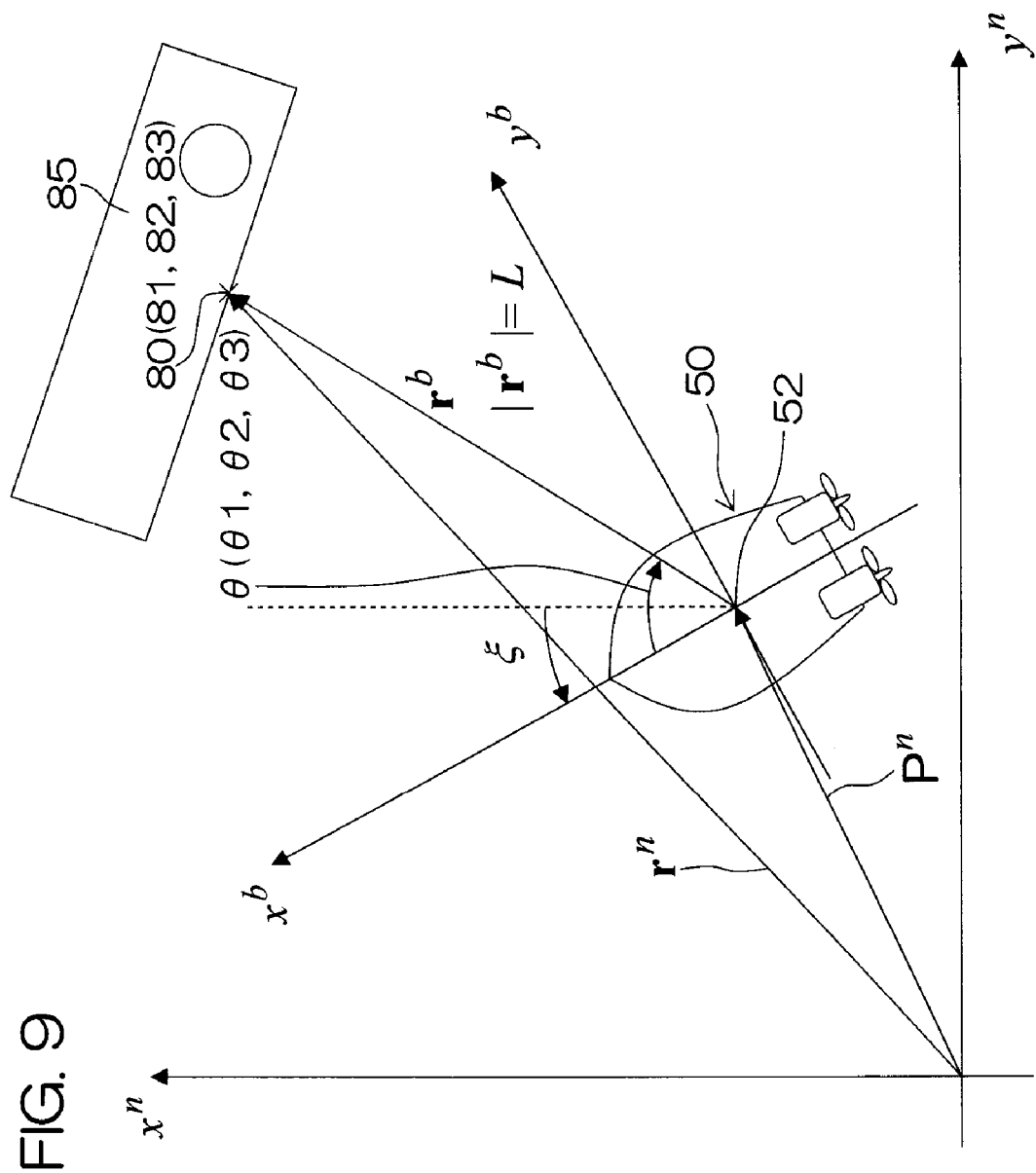
FIG. 9 is a schematic diagram for explaining how to determine the position vector of a measurement point subjected to the distance measuring operation.

As apparent from FIG. 9, the position vector $r^b$ of the measurement point 80 (any of the first to third measurement points 81 to 83) projected on the xy-plane is given by the following expression. A symbol "T" means transposition of a vector, and ditto in the following description.

$$r^b = [L\cos\theta, L\sin\theta, 0]^T \quad (5)$$

The positional information computing section 31 transforms the measurement point position vector $r^b$ in the hull coordinate system into a measurement point position vector $r^n$ in the local coordinate system by the following expressions:

$$r^n = P^n + R_b^n(\xi)r^b \quad (6)$$

$$R_b^n(\xi) = \begin{bmatrix} \cos\xi & -\sin\xi & 0 \\ \sin\xi & \cos\xi & 0 \\ 0 & 0 & 1 \end{bmatrix} \quad (7)$$

wherein $R^n_b$ is a transformation matrix from the hull coordinate system to the local coordination system, and $\xi$ is the azimuth angle of the bow direction in the local coordinate system (see FIG. 9).

This process is performed on each of the first, second and third measurement points 81, 82, 83, whereby measurement point position vectors of the measurement points 81, 82, 83 in the local coordinate system are determined.

4. Algorithm for Calculating Target Berthing Position

Next, a computation for setting the target berthing position will be described.

4-1. Step 1: Computation of Measurement Point Position Vectors

Figure 10:
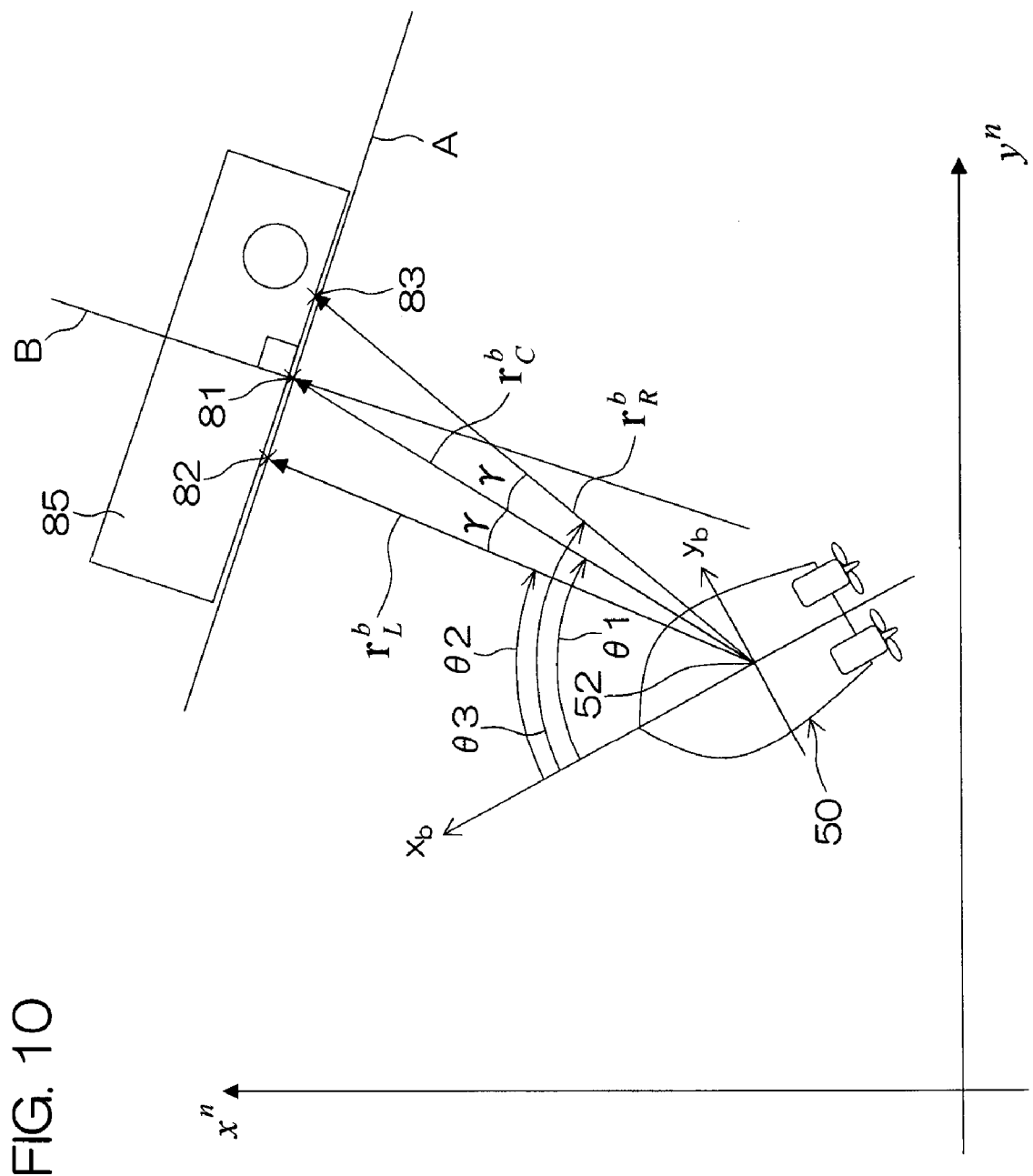
FIG. 10 is a schematic diagram illustrating an example of three measurement points including the candidate docking position, and an exemplary regression line for approximation of the arrangement of the three measurement points.

As shown in FIG. 10, the first measurement point 81 corresponding to the candidate docking position input from the touch panel 7 is represented by a first measurement point position vector $r_C^b$ in the hull coordinate system. The camera actuator controlling section 26 defines two directions laterally (horizontally) spaced a predetermined angle $\gamma$ from the first measurement point position vector $r_C^b$, and defines the second measurement point 82 and the third measurement point 83 (reference positions) at intersections of the two directions and the structure 85 present around the candidate docking position. The second and third measurement points 82, 83 are respectively represented by a second measurement point position vector $r_L^b$ and a third measurement point position vector $r_R^b$ in the hull coordinate system.

The positional information computing section 31 acquires information on the azimuth angles $\theta1$ to $\theta3$ and the elevation angles $\psi1$ to $\psi3$ ($\psi1=\psi2=\psi3$) of the first to third measurement points 81 to 83 from the camera actuator controlling section 26, and determines the first to third measurement point position vectors $r_C^b$, $r_L^b$, $r_R^b$ in the hull coordinate system in the aforementioned manner. Further, the positional information computing section 31 transforms the first to third measurement point position vectors $r_C^b$, $r_L^b$, $r_R^b$ in the hull coordinate system into first to third measurement point position vectors $r_C^n$, $r_L^n$, $r_R^n$ in the local coordinate system. The expression (6) described above is used for the transformation.

4-2. Step 2: Calculation of Regression Line

The regression process computing section 32 acquires the first to third measurement point position vectors $r_C^n$, $r_L^n$, $r_R^n$ in the local coordinate system from the positional information computing section 31, and determines a regression line A (expressed by the following expression (8)) which approximates the first to third measurement points 81 ($x_C, y_C$), 82 ($x_L, y_L$), 81 ($X_R, Y_R$) in the xy-plane of the local coordinate system.

$$y = a_A x + b_A \quad (8)$$

The regression line A is determined by a least square method represented by the following expressions:

$$\beta = (X^T X)^{-1} X^T y \quad (9)$$

$$\beta = \begin{bmatrix} a_A \\ b_A \end{bmatrix}, X = \begin{bmatrix} x_L & 1 \\ x_C & 1 \\ x_R & 1 \end{bmatrix}, y = \begin{bmatrix} y_L \\ y_C \\ y_R \end{bmatrix} \quad (10)$$

4-3. Step 3: Calculation of Sum of Squares of Errors

Figure 11:
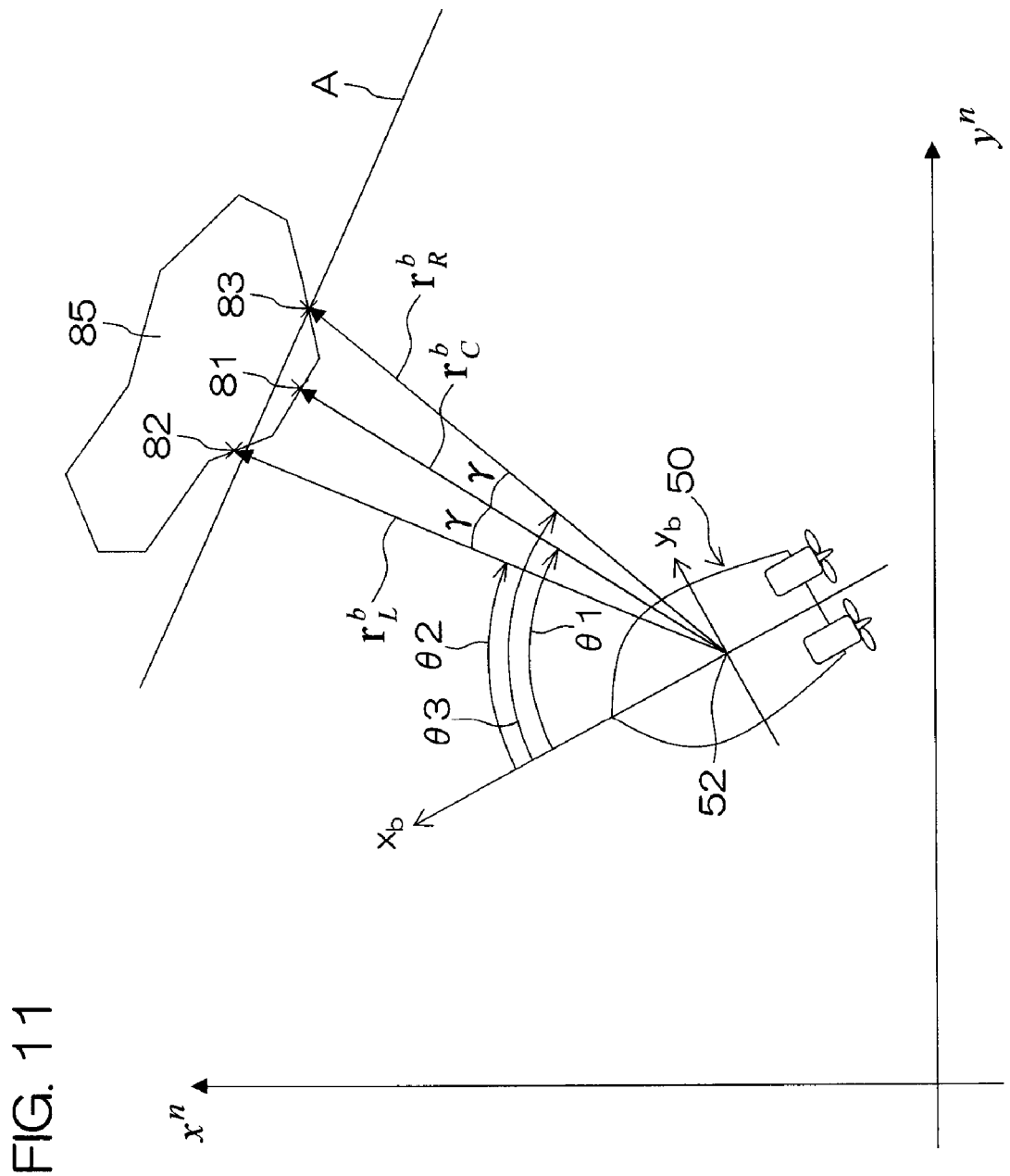
FIG. 11 is a schematic diagram illustrating another example of three measurement points including the candidate docking position, and another exemplary regression line for approximation of the arrangement of the three measurement points.
Figure 11A:
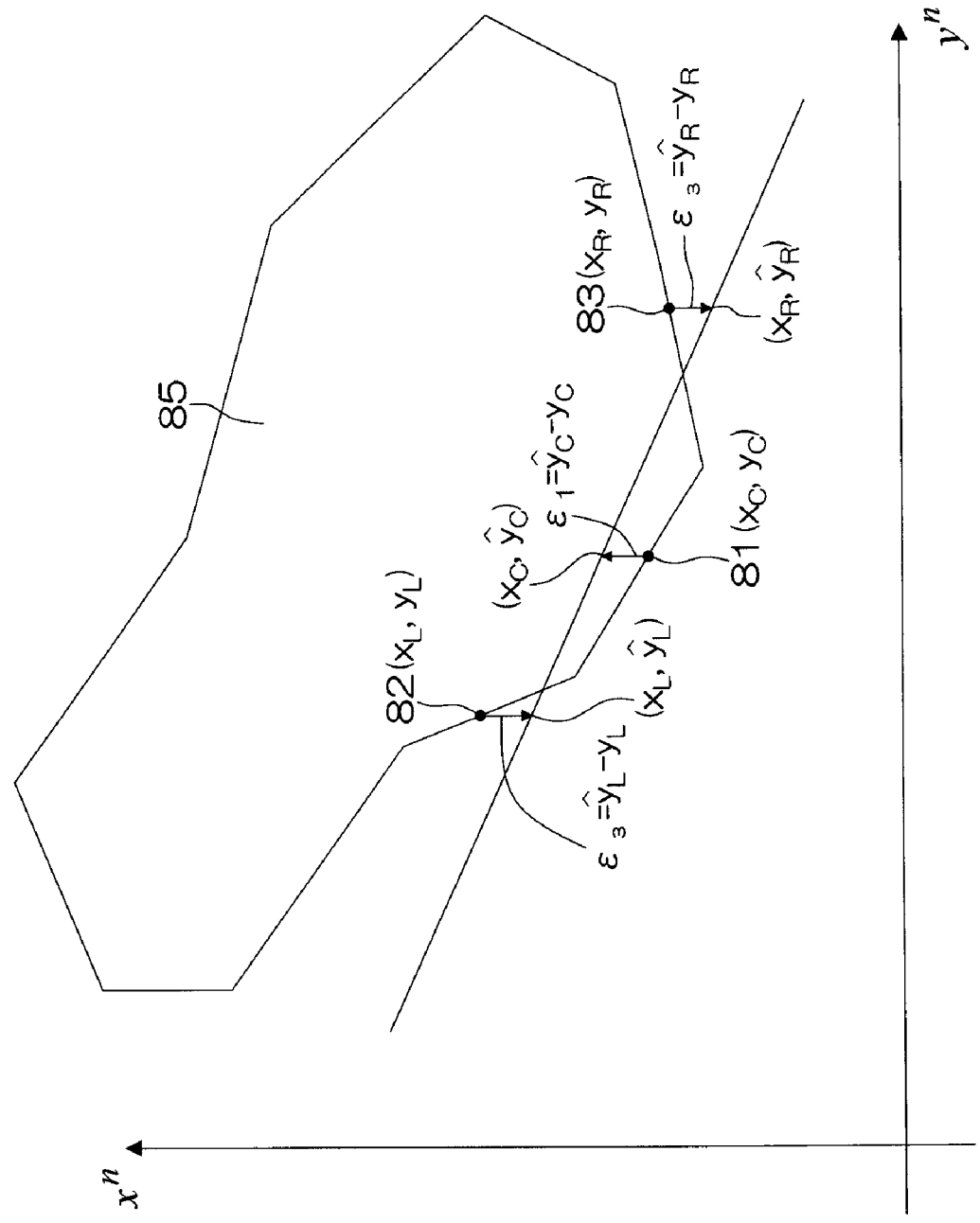
FIG. 11A is a schematic diagram illustrating a portion of FIG. 11 on a greater scale for explaining computation of a regression error.

Next, the regression process computing section 32 calculates the sum SSE ($= \epsilon_1^2 + \epsilon_2^2 + \epsilon_3^2$) of the squares of the errors $\epsilon_1, \epsilon_2, \epsilon_3$ of the first to third measurement points 81, 82, 83 with respect to the regression line A. The following expression is used for the calculation:

$$SSE = (\hat{y}_C - y_C)^2 + (\hat{y}_L - y_L)^2 + (\hat{y}_R - y_R)^2 \quad (11)$$

wherein $\hat{y}_C, \hat{y}_L, \hat{y}_R$ are values obtained when x-coordinates $x_C, x_L, x_R$ of the first to third measurement points 81, 82, 83 in the local coordinate system are applied to the regression line A (expressed by the expression (8)) as shown in FIG. 11A. Further, $\epsilon_1 = y_C - \hat{y}_C, \epsilon_2 = y_L - \hat{y}_L, \epsilon_3 = y_R - \hat{y}_R$.

4-4. Step 4: Judgment on Docking Suitability

The docking suitability judging section 34 judges whether or not the sum SSE of the squares of the errors is greater than the predetermined threshold Th.

If the sum SSE of the squares of the errors is greater than the predetermined threshold Th, the structure 85 in the candidate docking site has greater undulations with respect to the regression line A as shown in FIGS. 11 and 11A. In this case, safe docking of the marine vessel 50 is probably impossible, so that the docking suitability judging section 34 judges that candidate docking site is not suitable for docking.

On the other hand, if the sum SSE of the squares of errors is not greater than the threshold Th, the structure 85 in the candidate docking site is regarded as having a configuration fitted along the regression line A as shown in FIG. 10. In this case, the docking suitability judging section judges that the marine vessel 50 can be safely docked.

4-5. Step 5: Computation of Target Berthing Position

The first measurement point 81 as the candidate docking position is located on a surface of the structure 85 as shown in FIGS. 10, 11, and 11A. Therefore, if the marine vessel 50 is maneuvered so that the gravity center 52 of the marine vessel 50 coincides with the first measurement point 81, there is a possibility that the marine vessel 50 bumps against the structure 85 before the marine vessel 50 is sufficiently decelerated.

Therefore, the target position setting section 33 defines the first measurement point 81 as a temporary target berthing position, and sets an actual target berthing position at a position which is offset from the first measurement point 81 away from the structure 85.

More specifically, the target position setting section determines a line B (see FIG. 10) extending through the first measurement point 81 (candidate docking position) perpendicularly to the regression line A by the following expression:

$$y = -\frac{a_A}{b_A} x + \frac{a_A}{b_A} x_C + y_C \quad (12)$$

Further, the target position setting section 33 determines a target berthing position vector $r_0^n$ ($= r_C^n + r_{off}^n$) by adding an offset vector $r_{off}^n$ extending along the line B to the first measurement point position vector $r_C^n$ (in the local coordinate system).

4-6. Step 6: Computation of Target Berthing Position Information (Latitude/Longitude information)

The positional Information computing section 31 transforms the target berthing position vector $r_0^n$ in the local coordinate system into a target berthing position vector $r_0^e$ in the ECEF coordinate system by the following expressions:

$$r_O^e = O^e + R_n^e(\Psi) r^n \quad (13)$$

$$R_n^e(\Psi) = \begin{bmatrix} -\cos\nu\sin\mu & -\sin\nu & -\cos\nu\cos\mu \\ -\sin\nu\sin\mu & \cos\nu & -\sin\nu\cos\mu \\ \cos\mu & 0 & -\sin\mu \end{bmatrix} \quad (14)$$

wherein $R_n^e(\Psi)$ is a transformation matrix from the local coordinate system to the ECEF coordinate system.

Next, the positional information computing section 31 converts the target berthing position vector $r_0^e$ into the latitude $\nu$ and the longitude $\mu$ by the following approximation expressions to prepare positional information for the GPS.

$$\nu = \tan^{-1} \frac{y_e}{x_e} \quad (15)$$

$$\mu = \tan^{-1} \frac{z_e + e'^2 r_p \sin^3 t}{p - e^2 r_e \cos^3 t} \quad (16)$$

$$p = \sqrt{x_e^2 + y_e^2} \quad (17)$$

$$t = \tan^{-1} \frac{z r_e}{p r_p} \quad (18)$$

$$e^2 = \frac{(r_e^2 - r_p^2)}{r_e^2} \quad (19)$$

$$e'^2 = \frac{(r_e^2 - r_p^2)}{r_p^2} \quad (20)$$

The information on the latitude $\nu$ and the longitude $\mu$ of the target berthing position is thus prepared, and applied to the display controlling section 23. The display controlling section 23 can display the target position mark 43 at a proper position on the map based on the latitude/longitude information.

5. Computation of Offset Vector

Figure 12:
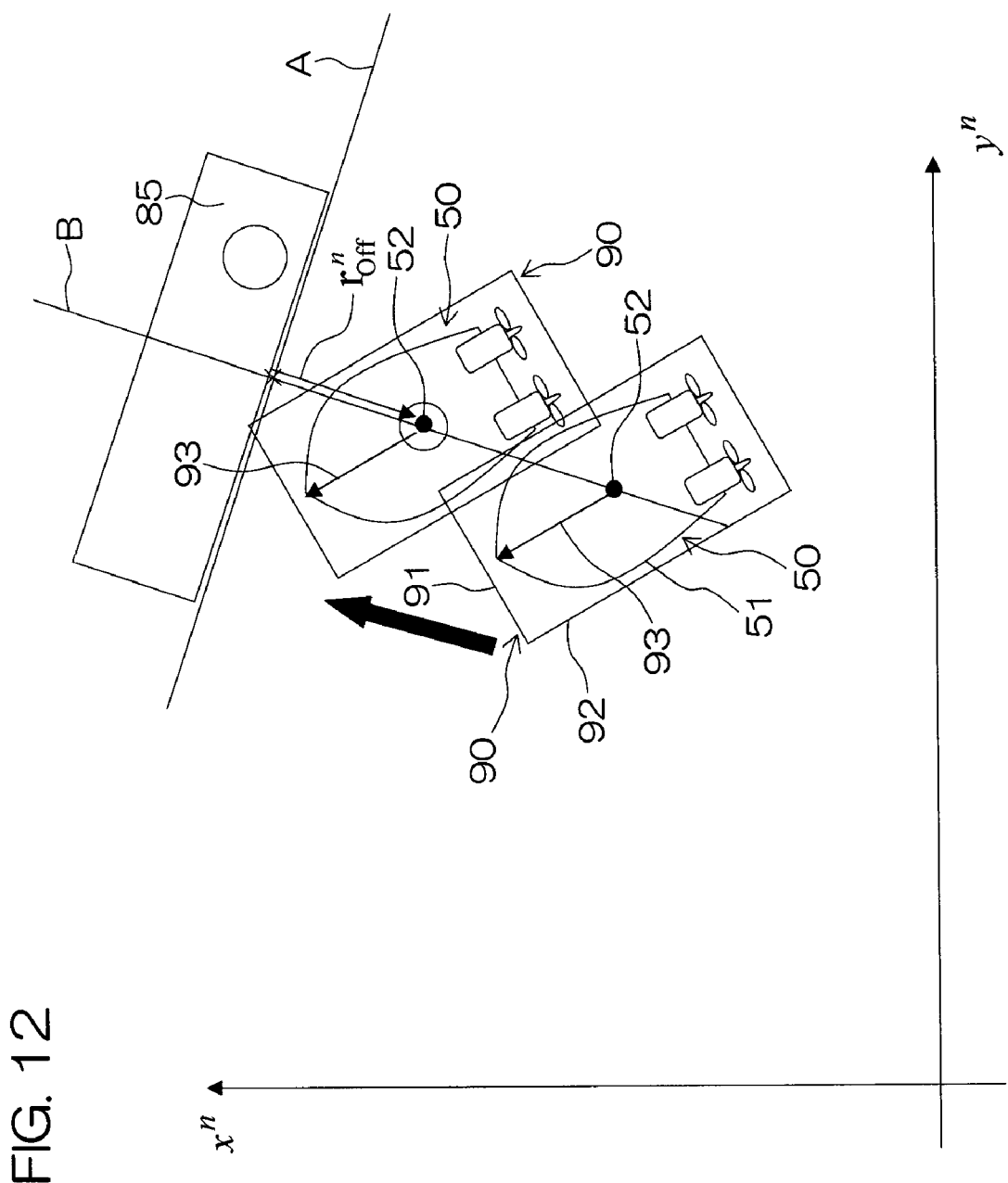
FIG. 12 is a schematic diagram for explaining principles for setting a target berthing position.

As shown in FIG. 12, a rectangular frame 90 as seen in plan is defined as surrounding the hull 51. Assuming a situation such that the gravity center 52 of the marine vessel 50 is located on the line B and the rectangular frame 90 contacts the regression line A, it is reasonable to define the target berthing position at the gravity center 52. Therefore, the offset vector $r_{off}^n$ is defined as a vector extending from the first measurement point 81 to the gravity center 52 of the marine vessel 50. By thus defining the offset vector $r_{off}^n$, the target berthing position can be determined, at which the marine vessel 50 is unlikely to bump against the structure 85.

The computation of the offset vector will be explained more specifically.

5-1. Step 1: Computation of Vectors Representing Rectangular Frame

The rectangular frame 90 is defined as having short edges 91 each extending transversely of the hull 51 and having a length equivalent to the width 2W of the hull 51 and long edges 92 each extending longitudinally of the hull 51 and having a length equivalent to the length 2H of the hull 51. It is herein assumed that the gravity center 52 of the marine vessel 50 coincides with the gravity center of the rectangular frame 90. For preventing contact of the hull 51 with the structure 85 as the docking site, it is sufficient to prevent the rectangular frame 90 from intersecting the regression line A.

Figure 13:
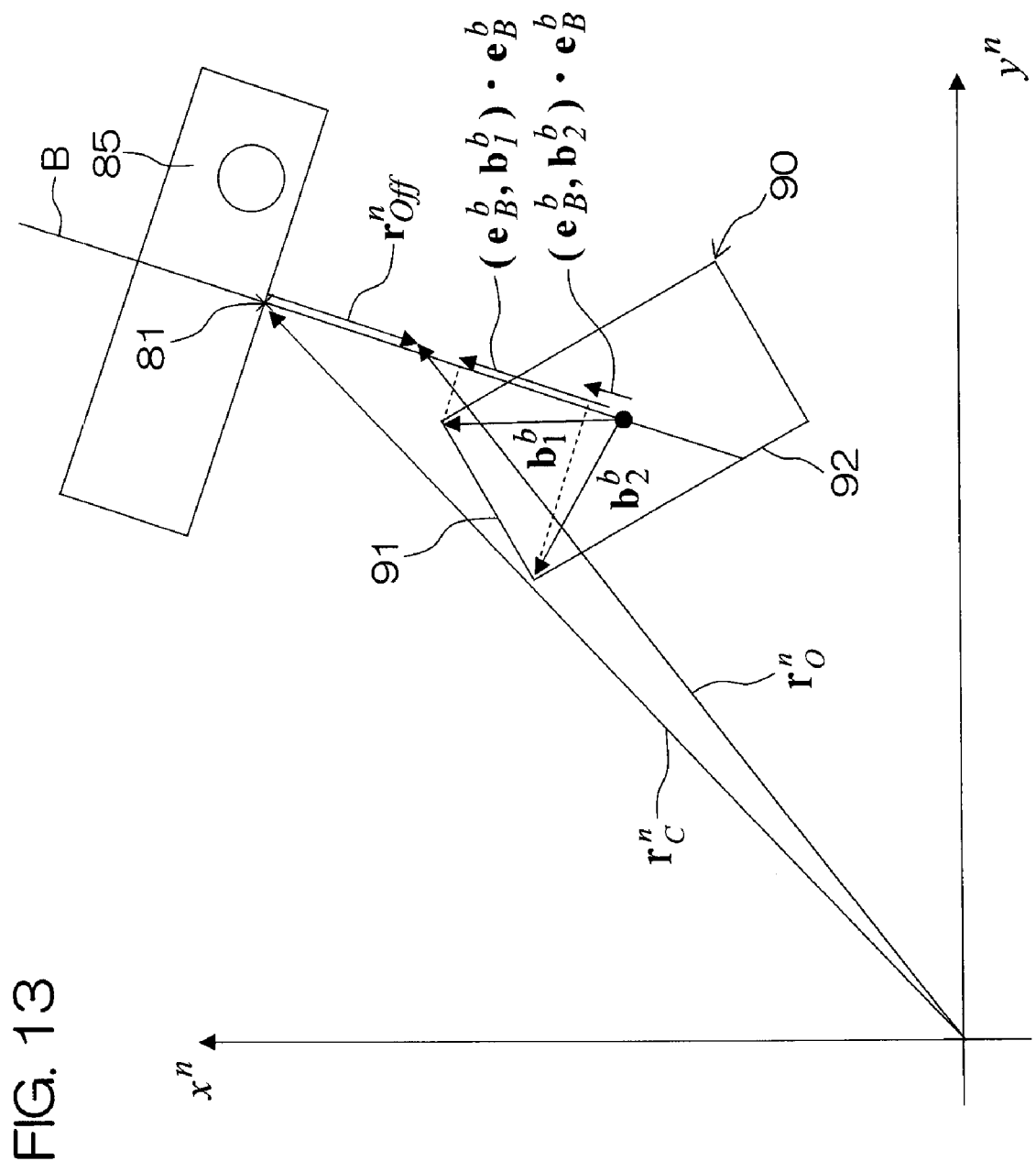
FIG. 13 is a diagram for explaining how to determine the position vector of the target berthing position.

Referring to FIG. 13, in the hull coordinate system which is defined by a target marine vessel azimuth angle ξ' (an angle of the bow direction 93 (see FIG. 12) with respect to the x-axis of the local coordinate system) when the marine vessel 50 is docked, position vectors $b_1^b$, $b_2^b$ of two adjacent vertexes of the rectangular frame 90 are given by the following expressions. A consideration will be given only to the position vectors $b_1^b$, $b_2^b$ of the vertexes located on the front side of the hull 51, because position vectors of the other two vertexes respectively have signs opposite from the signs of the position vectors $b_1^b$, $b_2^b$. The target marine vessel azimuth angle ξ' may be the azimuth angle of the bow direction observed at the start of the target berthing position setting operation. In this case, where the marine vessel maneuvering operation is performed in the lateral movement mode after the setting of the target berthing position, for example, the marine vessel 50 approaches the target berthing position with the hull 51 maintained at the target marine vessel azimuth angle ξ'.

$$b_1^b = [H, W, 0]^T \tag{21}$$

$$b_2^b = [H, -W, 0]^T \tag{22}$$

The target marine vessel azimuth angle ξ' may be automatically set as defining a direction parallel to the regression line A or a direction perpendicular to the regression line A. In this case, the operator may select one of these directions, which are displayed as candidates of the target marine vessel azimuth angle ξ' on the monitor 6. Further, the target marine vessel azimuth angle ξ' may be adjusted on the monitor 6. In this case, an input device for inputting the target marine vessel azimuth angle ξ' may be provided on the control console 56.

5-2. Step 2: Computation for Orthogonal Projection to Line B

The target position setting section 33 determines vectors by projecting the position vectors $b_1^b$, $b_2^b$ to the line B by the following expressions:

$$(e_B^b, b_1^b) \cdot e_B^b \tag{23}$$

$$(e_B^b, b_2^b) \cdot e_B^b \tag{24}$$

$$e_B^b = R_n^b(\xi') e_B^n \tag{25}$$

$$R_n^b(\xi') = \begin{bmatrix} \cos\xi' & \sin\xi' & 0 \\ -\sin\xi' & \cos\xi' & 0 \\ 0 & 0 & 1 \end{bmatrix} \tag{26}$$

Wherein $e_B^n$ is a unit direction vector (unit vector extending along the line B) obtained by normalizing a vector defined by two different points on the line B in the local coordinate system.

5-3. Step 3: Computation of Offset Vector in Hull Coordinate System

A greater one of the two orthogonal projection vectors $(e^{nb}, b_1^b) \cdot e_B^b$ $(e_B^b, b_2^b) \cdot e_B^b$ is selected, and the selected orthogonal projection vector is multiplied by a safety factor κ (κ>1, e.g., 1.5) to determine the offset vector $r_{off}^b$ in the hull coordinate system. That is, the computation is based on the following expression:

$$r_{off}^b = \begin{cases} \kappa \cdot (e_B^b, b_1^b) \cdot e_B^b & \text{when } |(e_B^b, b_1^b) \cdot e_B^b| \geq |(e_B^b, b_2^b) \cdot e_B^b| \\ \kappa \cdot (e_B^b, b_2^b) \cdot e_B^b & \text{when } |(e_B^b, b_1^b) \cdot e_B^b| < |(e_B^b, b_2^b) \cdot e_B^b| \end{cases} \tag{27}$$

5-4. Step 4: Computation of Offset Vector in Local Coordinate System

The offset vector $r_{off}^b$ in the hull coordinate system is transformed into the offset vector $r_{off}^n$ in the local coordinate system by the following expressions:

$$r_{off}^n = R_b^n(\xi') r_{off}^b \tag{28}$$

$$R_b^n(\xi') = \begin{bmatrix} \cos\xi' & -\sin\xi' & 0 \\ \sin\xi' & \cos\xi' & 0 \\ 0 & 0 & 1 \end{bmatrix} \tag{29}$$

Where the starting point of the offset vector $r_{off}^n$ is the first measurement point (candidate docking position) 81, the end point of the offset vector $r_{off}^n$ is set as the target berthing position. The target berthing position is offset by an offset distance $|r_{off}^n|$ from the candidate docking position 81 along the line B.

6. Summary of this Preferred Embodiment

In this preferred embodiment, as described above, the operator specifies the candidate docking position via the touch panel 7, and the candidate docking position is defined as the first measurement point 81. Then, the points laterally offset by the angle γ from the first measurement point 81 are respectively defined as the second and third measurement points 82, 83. The distances L1, L2, L3 to the first to third measurement points 81 to 83 are measured by the distance sensor 8. Based on the distances L1, L2, L3 thus measured, the positional information computing section 31 determines the position vectors of the first to third measurement points 81 to 83. Based on the position vectors thus determined, the regression process computing section 32 determines the regression line A which approximates the first to third measurement points 81 to 83. Based on the sum SSE of the squares of the errors of the first to third measurement points 81 to 83 with respect to the regression line A, the docking suitability judging section 34 judges whether or not the candidate docking position (first measurement point 81) is suitable for docking. If it is judged that the candidate docking position is not suitable for docking, the message indicating this judgment is displayed on the monitor 6. Thus, the operator recognizes that safe docking of the marine vessel 50 at the specified candidate docking position is probably impossible.

On the other hand, if the docking suitability judging section 34 judges that the candidate docking position is suitable for docking, the target position setting section 33 sets the target berthing position. More specifically, the target position setting section 33 sets the target berthing position at the position offset from the candidate docking position along the line B extending through the candidate docking position perpendicularly to the regression line A. The direction of the offset is a direction extending away from the structure 85 at the candidate docking position (in general, a direction extending toward the current position of the marine vessel 50). The offset distance is determined such that the phantom rectangular frame 90 surrounding the marine vessel 50 does not intersect the regression line A.

Thus, the target berthing position is set at the position which is adjacent to the candidate docking position judged to be suitable for docking and ensures safe docking of the marine vessel 50 without bumping against the structure 85.

Further, the water depth information as well as the current position of the marine vessel 50 and the target berthing position are indicated on the map displayed on the screen of the monitor 6. Thus, the operator can judge whether or not the current position of the marine vessel 50 is in a shallow water area. Therefore, the water depth information can be used to determine whether or not the marine vessel 50 can be safely berthed at the target berthing position.

7. Other Preferred Embodiments 7-1. Case where the Distance Sensor is Movable with Respect to the TV Camera In the preferred embodiment described above, the distance sensor 8 is fixed integrally to the TV camera 4, so that the distance sensor 8 and the TV camera 4 are oriented in the same direction. Alternatively, the distance sensor 8 may be movable with respect to the TV camera 4.

For example, the aiming direction of the TV camera 4 may be changed only horizontally (laterally), and the measurement direction of the distance sensor 8 may be changed only vertically with respect to the TV camera 4. In this case, the aiming direction of the TV camera 4 and the measurement direction of the distance sensor 8 have the same azimuth angle. The aiming direction of the TV camera 4 is, for example, within a horizontal plane.

Figure 14:
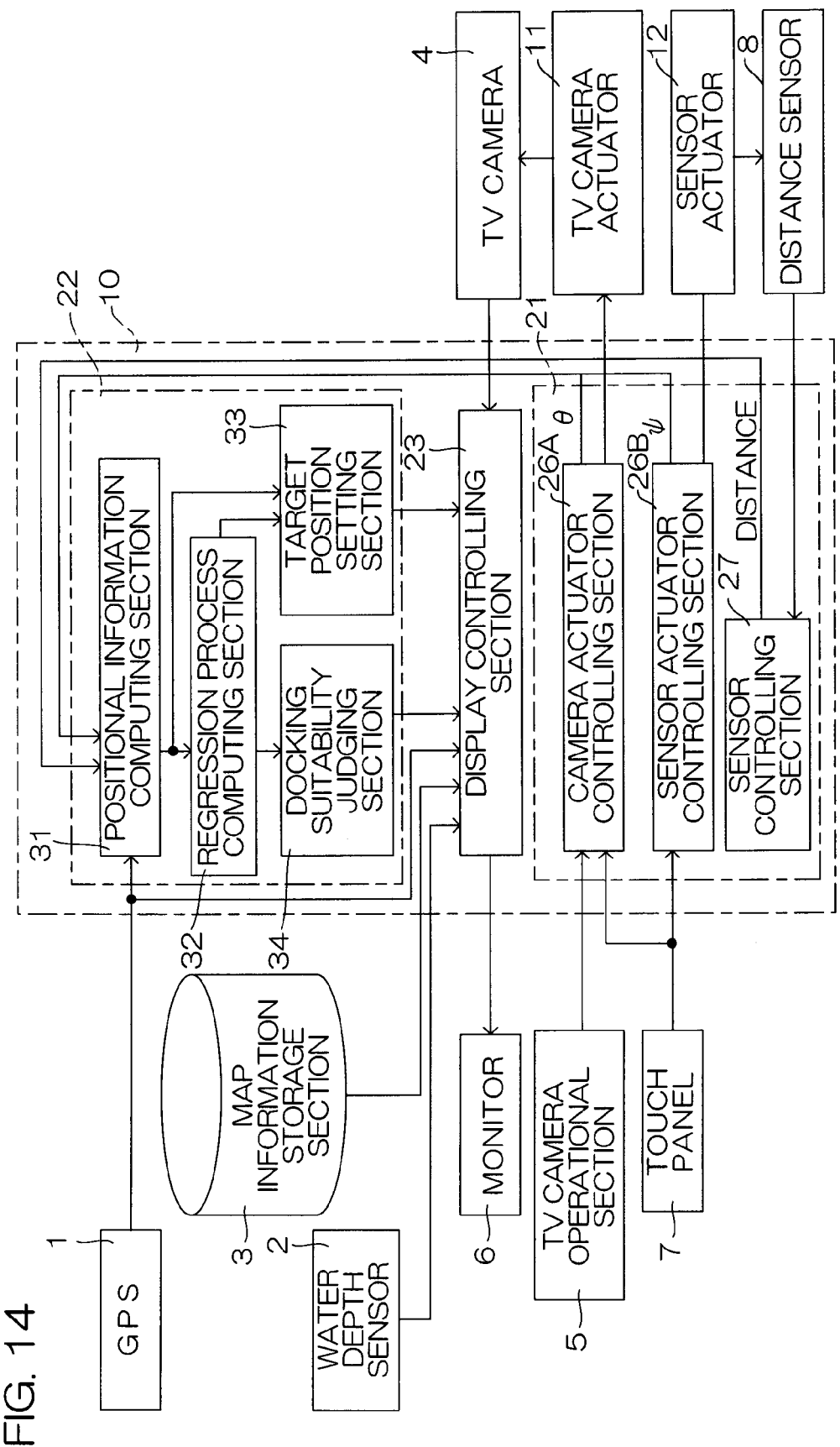
FIG. 14 is a block diagram for explaining the electrical construction of a docking supporting apparatus according to another preferred embodiment of the present invention.

An example of this arrangement is shown in FIG. 14. In this example, the distance measurement controlling section 21 includes a sensor actuator controlling section 26B in addition to a camera actuator controlling section 26A. A sensor actuator 12 for changing the measurement direction of the distance sensor 8 is attached to the distance sensor 8. The sensor actuator 12 is controlled by the sensor actuator controlling section 26B.

When the candidate docking position is specified by the touch panel 7, the azimuth angles θ of the TV camera 4 and the distance sensor 8 are controlled by the camera actuator controlling section 26A, and the elevation angle ψ of the distance sensor 8 is controlled by the sensor actuator controlling section 26B. Thus, the candidate docking position is defined as the first measurement point (temporary target berthing position) and positions laterally spaced the angle γ from the first measurement point are respectively defined as the second measurement point and the third measurement point. Then, the distances between the marine vessel 50 and the first to third measurement points are detected by the distance sensor 8.

Alternatively, the TV camera 4 may be arranged such that the aiming direction thereof is changed only horizontally (laterally), and the distance sensor 8 may be arranged such that the measurement direction thereof is changed both horizontally (laterally) and vertically with respective to the TV camera 4. The aiming direction of the TV camera 4 is, for example, within a horizontal plane.

In this case, the arrangement is substantially the same as the arrangement shown in FIG. 14, except that the camera actuator controlling section 26A controls the TV camera actuator 11 according to a command from the TV camera operating section 5. On the other hand, the sensor actuator controlling section 26B controls the sensor actuator 12 so as to orient the distance sensor 8 toward the candidate docking position specified by the touch panel 7. In this case, the sensor actuator controlling section 26B controls the sensor actuator 12 to control both the azimuth angle θ and the elevation angle ψ of the distance sensor 8. Thus, the candidate docking position is defined as the first measurement point, and the positions laterally spaced the angle γ from the first measurement position are respectively defined as the second measurement point and the third measurement point, and the distances between the marine vessel 50 and the first to third measurement points are detected by the distance sensor 8. The data on the azimuth angle θ and the elevation angle ψ are applied to the target berthing position setting section 22 from the sensor actuator controlling section 26B.

7-2. Initial Setting of Target Berthing Position

The initial value of the target berthing position may be set, for example, as corresponding to a start position of the marine vessel 50. That is, the positional information of the start position is detected by the GPS 1, and stored in a storage medium (not shown) provided in the marine vessel running controlling section 66 so as to be used as the initial value of the target berthing position. In this case, when the operator inputs a command for starting the target berthing position setting operation, the start position is defined as the candidate docking position without operation of the touch panel 7, and the TV camera 4 and the distance sensor 8 are directed toward the candidate docking position. With reference to the image displayed on the TV camera 4, the operator can check whether or not a second marine vessel berths at the start position and whether or not the water level is significantly changed, and immediately judge whether it is possible to berth the marine vessel 50 again at the start position. This alleviates the burden of the candidate docking position setting operation.

7-3. Automatic Marine Vessel Maneuvering Operation for Moving Marine Vessel to the Target Berthing Position In the preferred embodiment described above, the operator operates the control console 56 to guide the marine vessel 50 to the target berthing position while viewing the screen of the monitor 6. Alternatively, the marine vessel 50 may be automatically guided to the target berthing position when the marine vessel 50 is moved to the vicinity of the target berthing position (e.g., when the distance to the target berthing position is reduced to not greater than 20 m). For example, an automatic marine vessel berthing maneuvering button is provided and, when the automatic marine vessel berthing maneuvering button is operated, the outboard motors 61, 62 are automatically controlled by the marine vessel running controlling apparatus 66 and the outboard ECUs 63, 64 to guide the marine vessel 50 to the target berthing position.

7-4. Propulsion Mechanism for Marine Vessel

In the preferred embodiment described above, the pair of outboard motors 61, 62 are preferably provided. Alternatively, a single outboard motor may be provided on the center line 55 of the hull 51 instead of the outboard motors 61, 62, or a third outboard motor may be provided on the center line 55 of the hull 51 in addition to the two outboard motors 61, 62.

The type of the propulsion mechanism is not limited to the outboard motor, but other examples of the propulsion mechanism include an inboard/outboard motor (stern drive, inboard motor/outboard drive), an inboard motor, and a water jet drive.

While the present invention has been described in detail with reference to the preferred embodiments thereof, it should be understood that the foregoing disclosure is merely illustrative of the technical principles of the present invention but not limitative of the same. The spirit and scope of the present invention are to be limited only by the appended claims.

This application corresponds to Japanese Patent Application No. 2005-268587 filed in the Japanese Patent Office on Sep. 15, 2005, the disclosure of which is incorporated herein by reference.

What is claimed is:

1. A docking supporting apparatus for supporting docking of a marine vessel, the apparatus comprising:
    a distance measuring unit arranged to measure a distance between the marine vessel and a candidate docking site;
    a distance measurement controlling unit arranged to control the distance measuring unit to measure distances between the marine vessel and at least three measurement points defined around the candidate docking site;
    a configuration evaluating unit arranged to evaluate a configuration of the candidate docking site based on a regression analysis of the distances between the marine vessel and the at least three measurement points measured by the distance measuring unit and controlled by the distance measurement controlling unit; and
    a docking suitability judging unit which judges, based on a result of the evaluation made by the configuration evaluating unit, whether or not the candidate docking site is suitable for docking of the marine vessel.

2. The docking supporting apparatus as set forth in claim 1, wherein the configuration evaluating unit includes a positional information computing unit arranged to compute positional information of the at least three measurement points, and a regression process computing unit arranged to determine a regression line and a regression error by performing a linear regression process on the positional information of the at least three measurement points computed by the positional information computing unit, and
    the docking suitability judging unit is arranged to judge that the candidate docking site is not suitable for docking if the regression error is greater than a predetermined threshold, and judge that the candidate docking site is suitable for docking if the regression error is not greater than the predetermined threshold.

3. The docking supporting apparatus as set forth in claim 1, further comprising:
    an image pickup device arranged to pick up an image of the candidate docking site;
    a display device arranged to display the image picked up by the image pickup device; and
    a candidate docking position specifying unit arranged to allow an operator to specify a particular point as a candidate docking position in the image displayed on the display device; wherein
    the distance measurement controlling unit is arranged to use the candidate docking position specified by the candidate docking position specifying unit and at least two points defined within a predetermined azimuth angular range centering on the candidate docking position as the at least three measurement points.

4. The docking supporting apparatus as set forth in claim 2, further comprising a target berthing position setting unit arranged to set a target berthing position at a position which is spaced a predetermined offset distance from the regression line determined by the regression process computing unit.

5. The docking supporting apparatus as set forth in claim 4, wherein the target berthing position setting unit includes a unit arranged to determine the offset distance based on at least a length and a width of the marine vessel.

6. The docking supporting apparatus as set forth in claim 4, wherein the target berthing position setting unit is arranged to nullify the setting of the target berthing position if the docking suitability judging unit judges that the candidate docking site is not suitable for docking of the marine vessel.

7. The docking supporting apparatus as set forth in claim 4, further comprising:
    a position detecting unit arranged to detect a position of the marine vessel and generate marine vessel positional information;
    a map storage unit arranged to store map information on a marine vessel navigable area;
    a map display unit arranged to display the map information; and
    a display controlling unit arranged to read out a portion of the map information related to the marine vessel positional information generated by the position detecting unit from the map storage unit and cause the map display unit to display the portion of the map information together with the target berthing position set by the target berthing position setting unit.

8. The docking supporting apparatus as set forth in claim 1, further comprising:
    a position detecting unit arranged to detect a position of the marine vessel and generate marine vessel positional information;
    a map storage unit arranged to store map information on a marine vessel navigable area;
    a map display unit arranged to display the map information; and
    a display controlling unit arranged to read out a portion of the map information related to the marine vessel positional information generated by the position detecting unit from the map storage unit and cause the map display unit to display the portion of the map information.

9. The docking supporting apparatus as set forth in claim 8, further comprising a water depth measuring unit arranged to measure a water depth of a water area around the marine vessel; wherein
    the display controlling unit is arranged to cause the map display unit to display information on the water depth measured by the water depth measuring unit.

10. A marine vessel comprising:
    a hull; and
    a docking supporting apparatus as recited in claim 1, the docking supporting apparatus being mounted on the hull.

11. A docking supporting apparatus for supporting docking of a marine vessel, the apparatus comprising:
    a distance measuring unit arranged to measure a distance between the marine vessel and a candidate docking site;
    a distance measurement controlling unit arranged to control the distance measuring unit to measure distances between the marine vessel and at least three measurement points defined around the candidate docking site;
    a configuration evaluating unit arranged to evaluate undulations of the candidate docking site based on comparing the at least three measurement points with an imaginary line through the candidate docking site; and
    a docking suitability judging unit which judges, based on a result of the evaluation made by the configuration evaluating unit, whether or not the candidate docking site is suitable for docking of the marine vessel.

* * * * *